United States Patent
Yamamoto et al.

(10) Patent No.: US 10,719,704 B2
(45) Date of Patent: Jul. 21, 2020

(54) INFORMATION PROCESSING DEVICE, INFORMATION PROCESSING METHOD, AND COMPUTER-READABLE STORAGE MEDIUM STORING A PROGRAM THAT EXTRACTS AND CORRECTS FACIAL FEATURES IN AN IMAGE

(71) Applicant: Sony Semiconductor Solutions Corporation, Kanagawa (JP)

(72) Inventors: Hiroshi Yamamoto, Chiba (JP); Takayoshi Ozone, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 149 days.

(21) Appl. No.: 15/776,590

(22) PCT Filed: Nov. 11, 2016

(86) PCT No.: PCT/JP2016/083464
§ 371 (c)(1),
(2) Date: May 16, 2018

(87) PCT Pub. No.: WO2017/090454
PCT Pub. Date: Jun. 1, 2017

(65) Prior Publication Data
US 2018/0330160 A1   Nov. 15, 2018

(30) Foreign Application Priority Data
Nov. 25, 2015 (JP) .................. 2015-229646

(51) Int. Cl.
*G06K 9/00* (2006.01)
*H04N 1/387* (2006.01)
(Continued)

(52) U.S. Cl.
CPC ....... *G06K 9/00604* (2013.01); *G06K 9/0061* (2013.01); *G06K 9/00234* (2013.01);
(Continued)

(58) Field of Classification Search
CPC ........... G06K 9/00234; G06K 9/00255; G06K 9/00604; G06K 9/0061; G06K 9/2018;
(Continued)

(56) References Cited

U.S. PATENT DOCUMENTS

2018/0365484 A1* 12/2018 Yu .................. G06K 9/00248

FOREIGN PATENT DOCUMENTS

JP   2007-065880 A   3/2007
JP   2011-066809 A   3/2011
(Continued)

OTHER PUBLICATIONS

Written Opinion and English translation thereof dated Jan. 24, 2017 in connection with International Application No. PCT/JP2016/083464.
(Continued)

*Primary Examiner* — Nirav G Patel
(74) *Attorney, Agent, or Firm* — Wolf, Greenfield & Sacks, P.C.

(57) ABSTRACT

The present disclosure relates to an information processing device, an information processing method, and a program that enable appropriate imaging with the front camera of a smartphone or the like in the dark.
A visible light image and an infrared light image are captured. A face image is recognized from the infrared light image, and images of respective organs are extracted from the face image. The images of the respective organs are corrected in accordance with each extracted organ, using the visible light image and the infrared light image. The cor-
(Continued)

rected images of the respective organs are combined. The present disclosure can be applied to smartphones.

15 Claims, 24 Drawing Sheets

(51) Int. Cl.
| | |
|---|---|
| *H04N 1/62* | (2006.01) |
| *G06T 5/50* | (2006.01) |
| *H04N 5/33* | (2006.01) |
| *G06K 9/62* | (2006.01) |
| *H04N 9/64* | (2006.01) |
| *H04N 9/04* | (2006.01) |
| *G06K 9/20* | (2006.01) |
| *H04N 5/232* | (2006.01) |
| *G06T 5/00* | (2006.01) |
| *H04N 1/60* | (2006.01) |

(52) U.S. Cl.
CPC ....... *G06K 9/00255* (2013.01); *G06K 9/2018* (2013.01); *G06K 9/6202* (2013.01); *G06K 9/6289* (2013.01); *G06T 5/002* (2013.01); *G06T 5/009* (2013.01); *G06T 5/50* (2013.01); *H04N 1/387* (2013.01); *H04N 1/6005* (2013.01); *H04N 1/62* (2013.01); *H04N 1/624* (2013.01); *H04N 5/23219* (2013.01); *H04N 5/33* (2013.01); *H04N 9/045* (2013.01); *H04N 9/64* (2013.01); *G06T 2207/10024* (2013.01); *G06T 2207/10048* (2013.01); *G06T 2207/30201* (2013.01)

(58) Field of Classification Search
CPC ............. G06K 9/6202; G06K 9/6289; G06T 2207/10024; G06T 2207/10048; G06T 2207/30201; G06T 5/002; G06T 5/009; G06T 5/50; H04N 1/387; H04N 1/6005; H04N 1/62; H04N 1/624; H04N 5/23219; H04N 5/33; H04N 9/045; H04N 9/64
See application file for complete search history.

(56) References Cited

FOREIGN PATENT DOCUMENTS

| | | |
|---|---|---|
| JP | 2011-166523 A | 8/2011 |
| JP | 2014-049863 A | 3/2014 |
| JP | 2015-103906 A | 6/2015 |

OTHER PUBLICATIONS

International Preliminary Report on Patentability and English translation thereof dated Jun. 7, 2018 in connection with International Application No. PCT/JP2016/083464.

International Search Report and English translation thereof dated Jan. 24, 2017 in connection with International Application No. PCT/JP2016/083464.

* cited by examiner

INFORMATION PROCESSING DEVICE, INFORMATION PROCESSING METHOD, AND COMPUTER-READABLE STORAGE MEDIUM STORING A PROGRAM THAT EXTRACTS AND CORRECTS FACIAL FEATURES IN AN IMAGE

CROSS-REFERENCE TO RELATED APPLICATIONS

This application is a U.S. National Stage entry under 35 U.S.C. § 371 of International Application No. PCT/JP2016/083464, filed in the Japan Patent Office on Nov. 11, 2016, which claims priority to Japanese Patent Application No. 2015-229646, filed in the Japan Patent Office on Nov. 25, 2015; each of these earlier applications is incorporated by reference herein in its entirety.

TECHNICAL FIELD

The present disclosure relates to an information processing device, an information processing method, and a program, and more particularly, to an information processing device, an information processing method, and a program that enable appropriate imaging with the front camera of a smartphone or the like in the dark.

BACKGROUND ART

A smartphone normally has a camera provided on the back surface and another camera on the front surface on which, for example, a microphone for talking, a speaker, and a display formed with a liquid crystal display (LCD) or the like are provided.

The camera provided on the back surface has relatively high resolution and high sensitivity, and a light or the like may be provided on the back surface. However, the front camera provided on the front surface normally has low precision, and is not equipped with any light or the like. Therefore, the front camera is dark. Although people often take their own face images called "selfies", face images and the like cannot be clearly captured in the dark or the like.

In view of this, a technology has been suggested to capture a clear face image by capturing an image while infrared (IR) light is being emitted and using the luminance level of the image captured in the situation where the infrared light is being emitted (see Patent Document 1).

By the technology disclosed in Patent Document 1, however, strong reflection of infrared light is caused particularly at the irises, and therefore, a face image might generate a feeling of strangeness.

To counter this, a technology has been suggested to eliminate a feeling of strangeness in a face image due to reflection of infrared light when an infrared light image is used. By this technology, imaging in the dark is performed with the use of infrared light, and the luminance level of the irises is corrected and adjusted to a predetermined level (see Patent Document 2).

CITATION LIST

Patent Document

Patent Document 1: Japanese Patent Application Laid-Open No. 2011-166523

Patent Document 2: Japanese Patent Application Laid-Open No. 2014-049863

SUMMARY OF THE INVENTION

Problems to be Solved by the Invention

However, in a case where infrared light is used, the irises in particular reflect infrared light, causing the eyes to look smaller. This might cause a feeling of strangeness in a face image.

Also, a light source of infrared light is provided in a different position from that in a case where visible light such as strobe light is emitted. Because of the different light source position, an appearance of an unnatural pattern and unnatural color reproduction cannot be completely prevented by replacing the luminance of infrared light in an image.

The present disclosure is made in view of such circumstances, and particularly aims to enable appropriate imaging of a face image with the front camera of a smartphone or the like in the dark.

Solutions to Problems

An information processing device according to one aspect of the present disclosure is an information processing device that includes: an imaging unit that captures a visible light image and an infrared light image; an organ extraction unit that recognizes a face image from the infrared light image, and extracts images of respective organs from the face image; an organ image correction unit that corrects the images of the respective organs in accordance with each organ extracted by the organ extraction unit, using the visible light image and the infrared light image; and a combining unit that combines the images of the respective organs corrected by the organ image correction unit.

The organ image correction unit may include an image correction unit that corrects the images for each of the organs.

The images of the respective organs may include a skin color image, an iris image, a mouth image, and a nose image, and the image correction unit may include a skin color image correction unit that corrects the skin color image, an iris image correction unit that corrects the iris image, a mouth image correction unit that corrects the mouth image, and a nose image correction unit that corrects the nose image.

The skin color image correction unit may include: a separation unit that separates the visible light image in the skin color image into a chrominance component and a luminance component; a luminance component generation unit that generates a new luminance component by combining the luminance component separated by the separation unit and the infrared light image at a predetermined ratio; and a chrominance luminance combining unit that combines the new luminance component with the chrominance component, to generate an image having the skin color image corrected.

The information processing device may further include an operation input unit that receives an input of the predetermined ratio, and the luminance component generation unit combines the luminance component separated by the separation unit and the infrared light image at the predetermined ratio received as an input by the operation input unit, and generates a new luminance component.

The skin color image correction unit may include: a separation unit that separates the visible light image in the skin color image into a chrominance component and a luminance component; a comparison unit that compares the magnitude of the signal level of the luminance component separated by the separation unit with the magnitude of the signal level of the infrared light image on a pixel-by-pixel basis; and an adjustment unit that adjusts saturation of the chrominance component to the signal level of the infrared light image on the pixel-by-pixel basis, in accordance with a result of the comparison performed by the comparison unit.

If the comparison unit determines that the signal level of the infrared light image is higher than the signal level of the luminance component separated by the separation unit, the adjustment unit may raise the saturation of the chrominance component to the signal level of the infrared light image. If the comparison unit determines that the signal level of the infrared light image is lower than the signal level of the luminance component separated by the separation unit, the adjustment unit may lower the saturation of the chrominance component to the signal level of the infrared light image.

The adjustment unit may include a chrominance component extraction unit that extracts a chrominance component of a pixel near a target pixel, and, when the signal level of a luminance component of the target pixel is lower than an achromatic color determination threshold, the adjustment unit may replace the chrominance component of the visible light image at the target pixel with the chrominance component of the pixel near the target pixel, the chrominance component of the pixel near the target pixel being extracted by the chrominance component extraction unit.

The nose image correction unit may correct the nose image by a technique similar to the technique used by the skin color image correction unit.

The iris image correction unit may include: a pupil detection unit that detects the position and the shape of a pupil from the infrared light image in the iris image, a noise removal unit that removes noise from the visible light image of the iris image with a noise filter in conformity with the position and the shape of the pupil detected by the pupil detection unit; a chrominance luminance separation unit that separates a chrominance component and a luminance component from the visible light image of the iris image from which noise has been removed by the noise removal unit; an infrared light combining unit that combines the infrared light component of the iris image with the luminance component of the visible light image of the iris image; and a chrominance luminance combining unit that combines the chrominance component of the visible light image of the iris image separated by the chrominance luminance separation unit with a luminance component formed with the signal level of the infrared light image generated by the infrared light combining unit.

The iris image correction unit may further include: a pupil correction unit that has a holding unit for holding chrominance components of pupils in a plurality of colors in a preset state, and attach one of the chrominance components of the pupils in conformity with the position and the shape detected by the pupil detection unit. The pupil correction unit may attach the chrominance component of a pupil selected from among the chrominance components of the pupils in the plurality of colors to the chrominance component of the visible light image of the iris image separated by the chrominance luminance separation unit, in conformity with the position and the shape detected by the pupil detection unit, the chrominance components of the pupils in the plurality of colors being held in the holding unit.

The iris image correction unit may further include: a pupil correction unit that has the holding unit for holding chrominance components and luminance components of pupils in a plurality of colors in a preset state, and attaches the chrominance component and the luminance component of one of the pupils in conformity with the position and the shape detected by the pupil detection unit. The pupil correction unit may attach the chrominance component and the luminance component of a pupil selected from among the chrominance components and the luminance components of the pupils in the plurality of colors to the chrominance component of the visible light image of the iris image separated by the chrominance luminance separation unit and the luminance component formed with the signal level of the infrared light image generated by the infrared light combining unit, respectively, in conformity with the position and the shape detected by the pupil detection unit, the chrominance components and the luminance components of the pupils in the plurality of colors being held in the holding unit.

The iris image correction unit may further include: a pupil correction unit that includes: a holding unit that holds chrominance components of pupils in a plurality of colors in a preset state; and an approximate hue selection unit that selects a pupil in a similar hue in the position and the shape detected by the pupil detection unit from among the chrominance components of the pupils in the plurality of colors held in a preset state, the pupil correction unit attaching one of the chrominance components of the pupils in the plurality of colors held in a preset state in conformity with the position and the shape detected by the pupil detection unit. The pupil correction unit may attach the chrominance component of a pupil in a hue selected from among the chrominance components of the pupils in the plurality of colors by the approximate hue selection unit to the chrominance component of the visible light image of the iris image separated by the chrominance luminance separation unit, in conformity with the position and the shape detected by the pupil detection unit, the chrominance components of the pupils in the plurality of colors being held in the pupil holding unit.

The iris image correction unit may further include: a pupil correction unit that includes: a holding unit that holds chrominance components and luminance components of pupils in a plurality of colors in a preset state; and an approximate hue selection unit that selects a pupil in a similar hue in the position and the shape detected by the pupil detection unit from among the chrominance components and the luminance components of the pupils in the plurality of colors held in a preset state, the pupil correction unit attaching the chrominance component and the luminance component of one of the pupils in the plurality of colors held in a preset state in conformity with the position and the shape detected by the pupil detection unit. The pupil correction unit may attach the chrominance component and the luminance component of a pupil in a hue selected from among the chrominance components and the luminance components of the pupils in the plurality of colors by the approximate hue selection unit to the chrominance component of the visible light image of the iris image separated by the chrominance luminance separation unit and the luminance component formed with the signal level of the infrared light image generated by the infrared light combining unit, respectively, in conformity with the position and the shape detected by the pupil detection unit, the chrominance components and the luminance components of the pupils in the plurality of colors being held in the holding unit.

The mouth image correction unit may correct the mouth image by a technique similar to the technique used by the iris image correction unit.

An information processing method according to one aspect of the present disclosure is an information processing method including the steps of: capturing a visible light image and an infrared light image; recognizing a face image from the infrared light image, and extracting images of respective organs from the face image; correcting the images of the respective organs in accordance with each extracted organ, using the visible light image and the infrared light image; and combining the corrected images of the respective organs.

A program according to one aspect of the present disclosure is a program for causing a computer to function as: an imaging unit that captures a visible light image and an infrared light image; an organ extraction unit that recognizes a face image from the infrared light image, and extracts images of respective organs from the face image; an organ image correction unit that corrects the images of the respective organs in accordance with each organ extracted by the organ extraction unit, using the visible light image and the infrared light image; and a combining unit that combines the images of the respective organs corrected by the organ image correction unit.

In one aspect of the present disclosure, a visible light image and an infrared light image are captured, and a face image is recognized from the infrared light image. Images of respective organs are extracted from the face image. In accordance with each extracted organ, the images of the respective organs are corrected with the use of the visible light image and the infrared light image. The corrected images of the respective organs are combined.

Effects of the Invention

According to one aspect of the present disclosure, it is possible to appropriately capture a face image in the dark with the front camera of a smartphone or the like.

MODE FOR CARRYING OUT THE INVENTION

Figure 1:
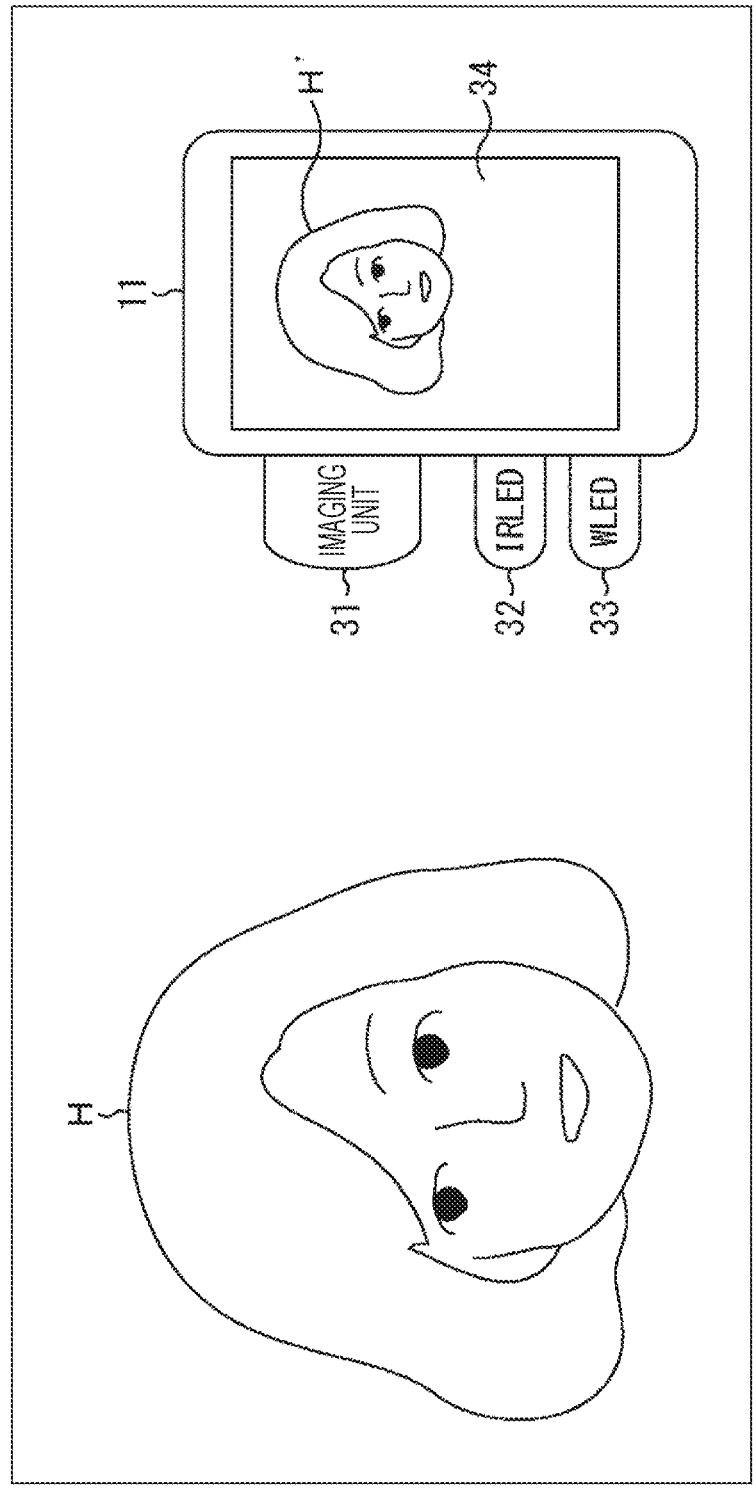
FIG. 1 is a perspective view of the exterior of an information processing device to which the technology of the present disclosure is applied.

The following is a detailed description of preferred embodiments of the present disclosure, with reference to the accompanying drawings. It should be noted that, in this specification and the drawings, components having substantially the same functional structures are denoted by the same reference numerals, and explanation of then will not be repeated.

<Perspective View of the Exterior of an Information Processing Device of the Present Disclosure>

FIG. 1 is a perspective view of the exterior of an information processing device to which the technology of the present disclosure is applied. The information processing device 11 in FIG. 1 is, for example, a smartphone or the like, and includes an imaging unit 31 having a front camera for capturing an image in a direction opposite to the surface provided with a display unit 34 formed with a touch panel, an infrared light emitting unit (IRLED) 32 that emits infrared light in the imaging direction of the imaging unit 31 in the dark, and a white light emitting unit (WLED) 33 that emits white light in the same direction.

FIG. 1 shows a state where a user H holding the information processing device 11 is imaged by the imaging unit 31, and a user H' imaged by the imaging unit 31 is displayed on the display unit 34.

To check the imaging angle of view in the dark, the information processing device 11 controls the infrared light emitting unit 32 to emit infrared light that cannot be visually recognized by the user, captures a live view image corresponding to the infrared light, and displays the live view image on the display unit 34.

Here, a live view image is an image displayed on the display unit 34 as an almost moving image with a lower resolution and a lower frame rate than in a normal imaging state, for example. The user checks the angle of view while watching the live view image, and determines the imaging position. Therefore, a live view image is an image intended to be displayed to the user, and is not an image to be recorded on, for example, a recording medium like an image taken by operating the shutter.

Then, when an operation input unit 34a (FIG. 2) functioning as a shutter displayed as a graphical user interface (GUI) on the display unit 34 formed with touch panel is operated, the information processing device 11 reduces light emission from the infrared light emitting unit 32 (or turns off the infrared light emitting unit 32), and causes the white light emitting unit 33 to emit light. At the same time, the information processing device 11 captures an image at that moment as a visible light image that is still image color information. Then, when the capturing of the visible light image is finished, the information processing device 11 turns off the white light emitting unit 33, and captures a red light image by causing the infrared light emitting unit 32 to project infrared light. Further, the information processing device 11 identifies a face image from the infrared light image, extracts organs such as the skin, the eyes, the nose, and the mouth in the face image, performs color correction suitable for the respective organs, and displays an image formed with the corrected images.

That is, when an image is captured with the front camera in the dark, the information processing device 11 in FIG. 1 displays a live view image formed with a glare-free image based on infrared light until the angle of view is determined. After the angle of view is determined, and the shutter is operated, the white light emitting unit 33 is caused to emit light like a strobe light to capture a visible light image, the red light emitting unit 32 is then caused to emit light to capture a red light image, and the face image is corrected by using the visible light image and the red light image.

With such an operation, the information processing device 11 can appropriately determine the angle of view before capturing an image with the front camera in the dark such as during night-time. Further, when capturing an image, the information processing device 11 can capture an image corrected in accordance with the respective organs shown in the face image.

<Example Configuration of a First Embodiment of the Information Processing Device>

Figure 2:
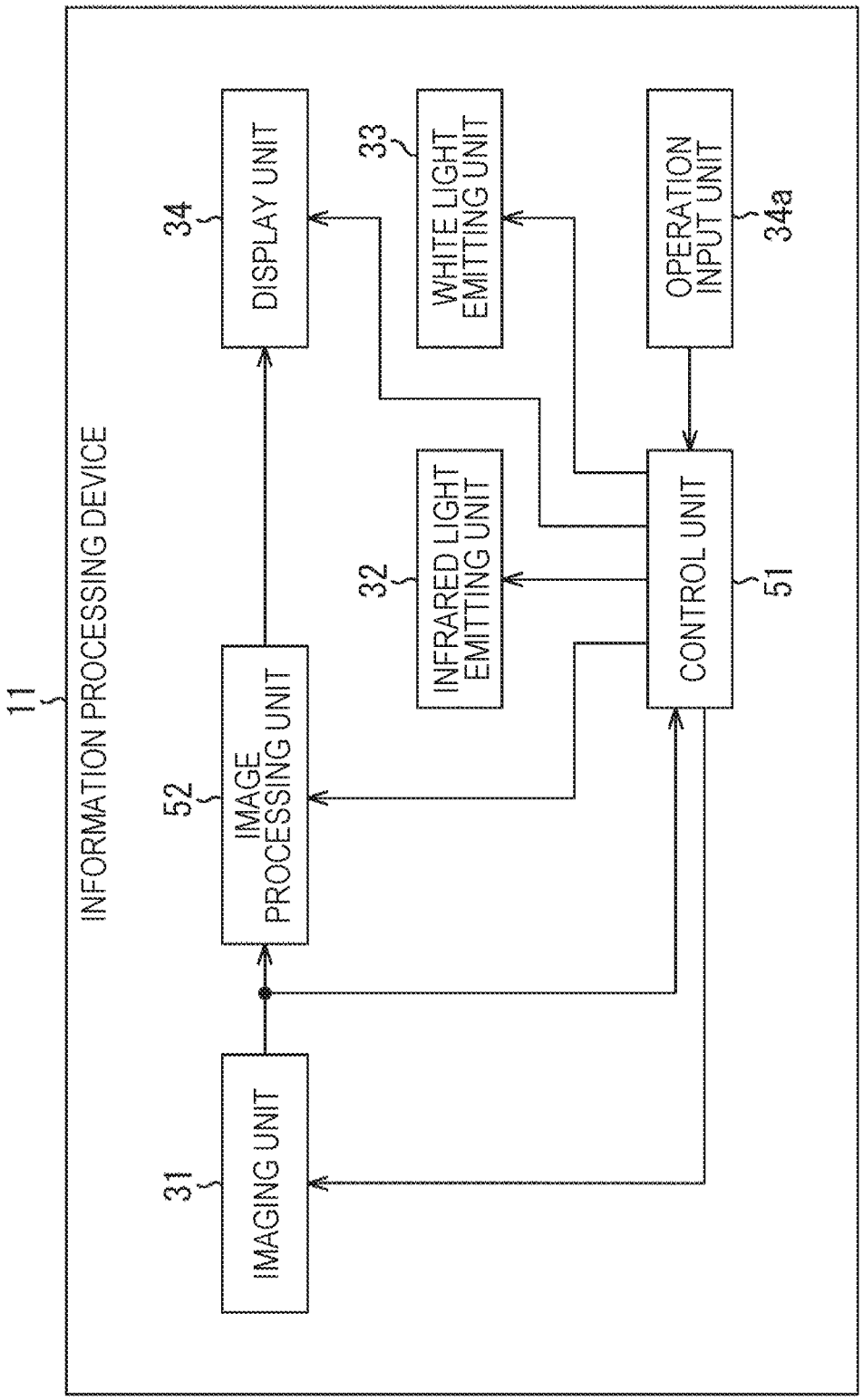
FIG. 2 is a diagram for explaining an example configuration of the information processing device shown in FIG. 1.

Referring now to the block diagram shown in FIG. 2, a specific example configuration of a first embodiment of the information processing device 11 in FIG. 1 is described.

The information processing device 11 includes an imaging unit 31, an infrared light emitting unit (IRLED) 32, a white light emitting unit (WLED) 33, a display unit 34, an operation input unit 34a, a control unit 51, and an image processing unit 52.

The control unit 51 is formed with a computer that includes a central processing unit (CPU), a random access memory (RAM), a read only memory (ROM), and the like, and controls the overall operation of the information processing device 11.

The imaging unit 31 is formed with a complementary metal oxide semiconductor (CMOS) image sensor or the like. Under the control of the control unit 51, the imaging unit 31 captures an infrared light image and a visible light image, and supplies the images to the image processing unit 52. In addition to visible light such as RGB, the imaging unit 31 can capture images corresponding to invisible light such as infrared light (IR) emitted from the infrared light emitting unit 32, for example.

In accordance with the infrared light image and the visible light image captured by the imaging unit 31, the image processing unit 52 recognizes the face image, and extracts organs such as the eyes, the nose, the mouth, and the skin from the face image. After performing an appropriate correction process on each of the organs, the image processing unit 52 generates an image including the corrected face image by combining the corrected organ images, and causes the display unit 34 formed with a liquid crystal display (LCD) or the like to display the generated image. It should be noted that the configuration of the image processing unit 52 will be described later in detail with reference to FIG. 3.

The display unit 34 is formed with a touch panel or the like, and causes a GUI that operates a shutter button to function as the operation input unit 34a, by displaying various kinds of graphical user interface (GUI) images on its surface, for example. When the GUI is operated, a pressing operation on the shutter button is detected.

The infrared light emitting unit 32 emits auxiliary light that is infrared light (IR) having a wavelength of, for example, approximately 0.7 μm to 1 mm (=1000 μm), which is imageable in the imaging unit 31, belonging to a range of so-called near-infrared light, mid-infrared light, or far-infrared light It should be noted that, in the information processing device 11 formed with a smartphone or the like, an imaging unit that has higher resolution and higher sensitivity than the imaging unit 31 as the front camera is provided on a back surface portion not shown in the drawing, but is not explained herein.

<Example Configuration of the Image Processing Unit in FIG. 2>

Figure 3:
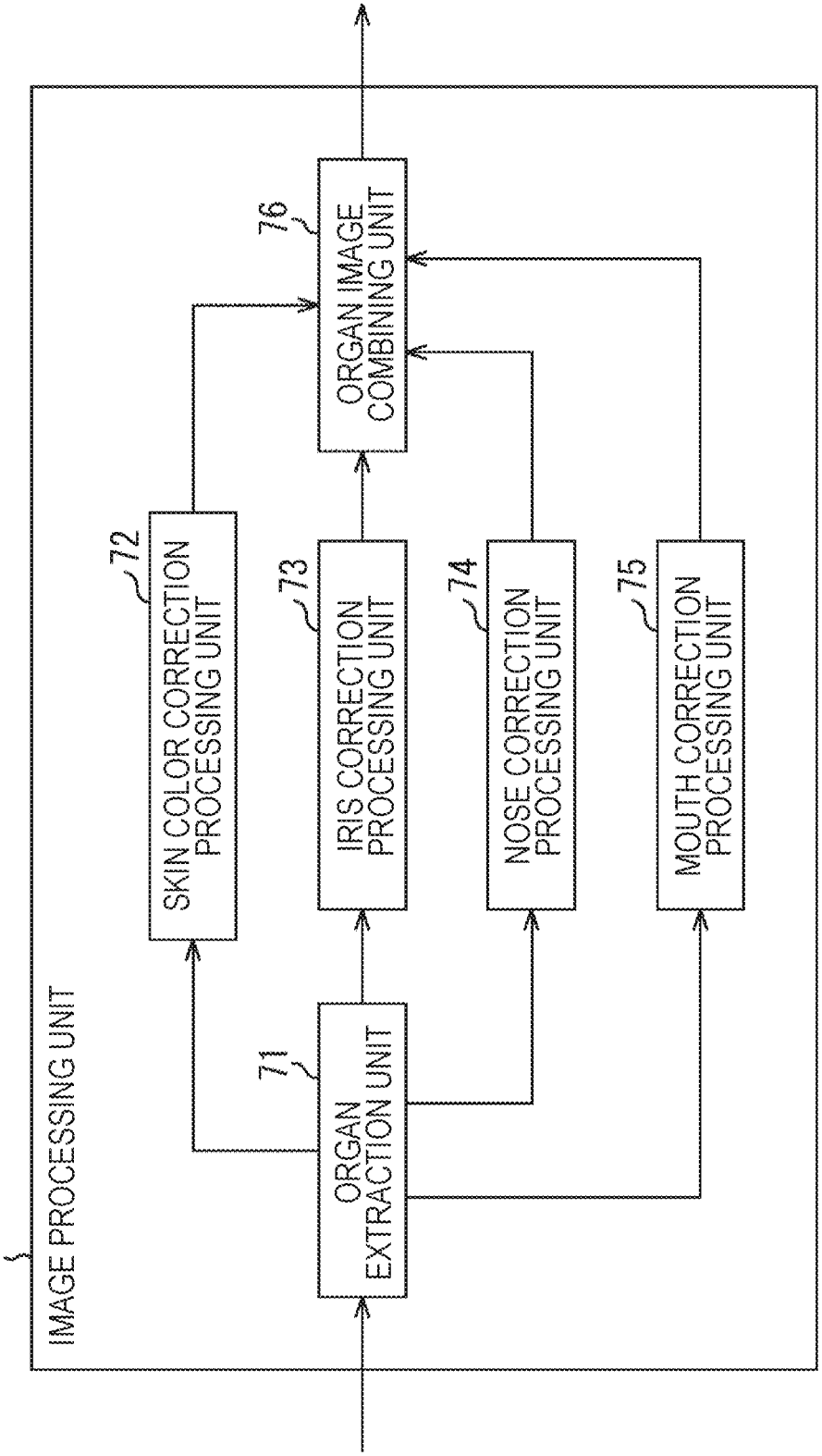
FIG. 3 is a diagram for explaining an example configuration of the image processing unit of the information processing device shown in FIG. 2.

Referring now to the block diagram shown in FIG. 3, an example configuration of the image processing unit 52 is described.

The image processing unit 52 includes an organ extraction unit 71, a skin color correction processing unit 72, an iris correction processing unit 73, a nose correction processing unit 74, a mouth correction processing unit 75, and an organ image combining unit 76.

The organ extraction unit 71 extracts a face image and performs organ extraction, using an infrared light image having the lower SNR between a visible light image and a red light image captured by the imaging unit 31. Organs are the eyes, the nose, the mouth, the skin color, and the like, which constitute the face image, and the term "organ extraction" as used herein refers to a process of extracting an image of the eyes, an image of the nose, an image of the mouth, and an image of the skin color from the face image. The organ extraction unit 71 supplies a skin color image of the skin color extracted in this manner to the skin color correction processing unit 72, supplies an iris image that is the image of the eyes to the iris correction processing unit 73, supplies a nose image that is the image of the nose to the nose correction processing unit 74, supplies a mouth image that is the image of the mouth to the mouth correction processing unit 75, and also supplies the respective visible light images and the respective red light images.

In accordance with the visible light image and the red light image, the skin color correction processing unit 72 corrects the color of the skin color image supplied as the image of the skin color by a method suitable for the skin color image, and supplies the corrected image to the organ image combining unit 76.

In accordance with the visible light image and the red light image, the iris correction processing unit 73 corrects the color of the iris image supplied as the image of the eyes by a method suitable for the iris image, and supplies the corrected image to the organ image combining unit 76.

In accordance with the visible light image and the red light image, the nose correction processing unit 74 corrects the color of the nose image supplied as the image of the nose by a method suitable for the nose image, and supplies the corrected image to the organ image combining unit 76.

In accordance with the visible light image and the red light image, the mouth correction processing unit 75 corrects the color of the mouth image supplied as the image of the mouth by a method suitable for the mouth image, and supplies the corrected image to the organ image combining unit 76.

The organ image combining unit 76 reconstructs the face image by combining the skin color image that is supplied from the skin color correction processing unit 72 and has been subjected to the skin color correction, the iris image that is supplied from the iris correction processing unit 73 and has been subjected to the iris color correction, the nose image that is supplied from the nose correction processing unit 74 and has been subjected to the color correction, and the mouth image that is supplied from the mouth correction processing unit 75 and has been subjected to the color correction. The organ image combining unit 76 outputs the reconstructed face image to the display unit 34 and causes the display unit 34 to display the face image, or records the reconstructed face image into a recording medium or the like (not shown).

<Imaging Process to be Performed by the Information Processing Device in FIG. 2>

Figure 4:
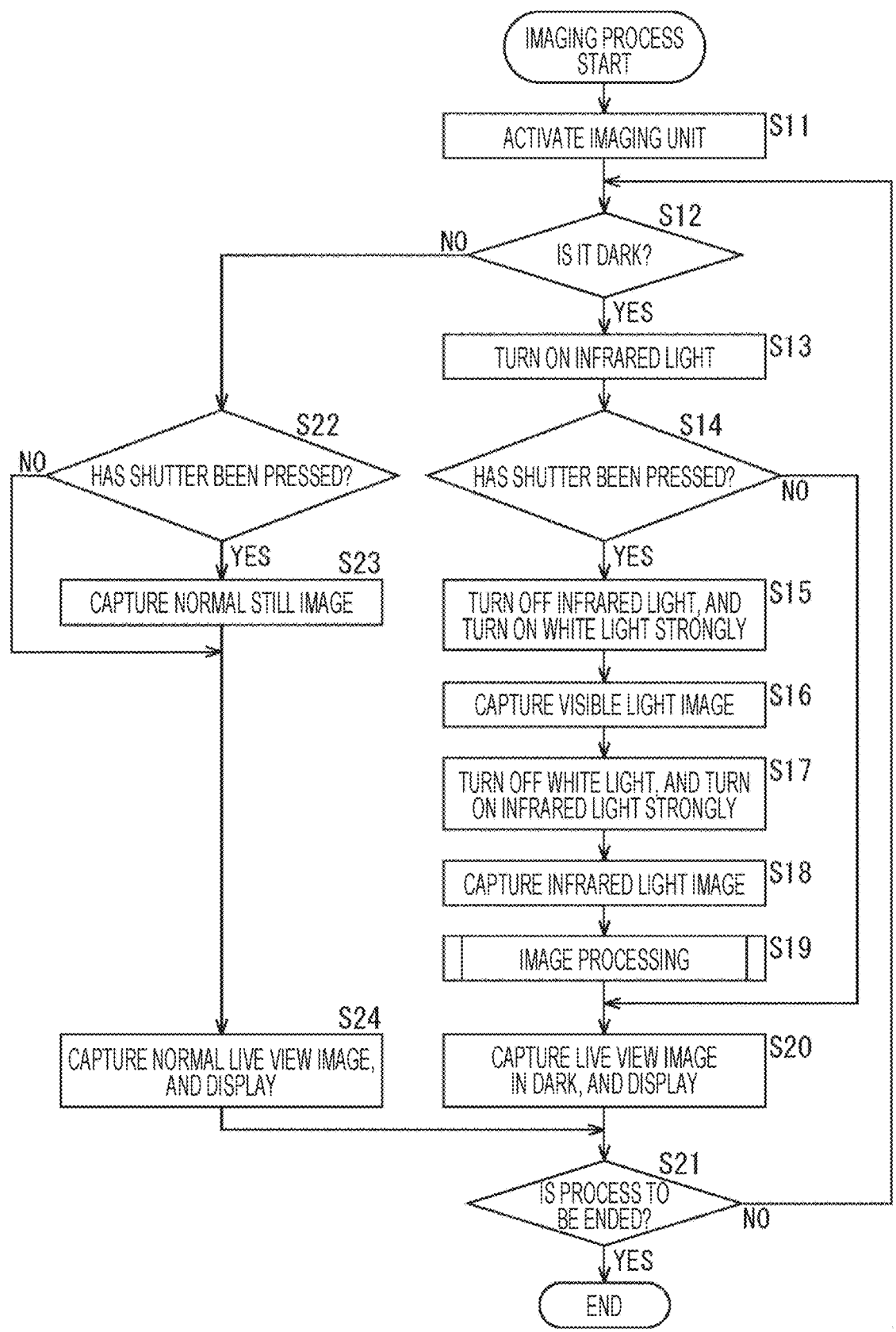
FIG. 4 is a flowchart for explaining an imaging process to be performed by the information processing device shown in FIG. 1.

Referring now to the flowchart shown in FIG. 4, an imaging process to be performed by the information processing device 11 shown in FIG. 2 is described. It should be noted that the imaging process is an imaging process to be performed when the imaging unit 31 formed with the front camera is used, for example, not an imaging process to be performed by the imaging unit provided on a back surface portion (not shown).

In step S11, the control unit 51 activates the imaging unit 31 so that an image can be captured. As a result, the imaging unit 31 sequentially supplies captured images to the control unit 51 and the image processing unit 52.

In step S12, the control unit 51 determines whether an image is a dark image with a lower illuminance than a predetermined illuminance, in accordance with an image captured by the imaging unit 31. If the captured image is determined not to have a lower illuminance than the predetermined illuminance and is regarded as an image with normal brightness in step S12, the process moves on to step S22.

In step S22, the control unit 51 determines whether the operation input unit 34a, which functions as a shutter button, has been displayed as a GUI image beforehand on the display unit 34, and an imaging instruction has been issued by operating the operation input unit 34a.

If it is determined in step S22 that the operation input unit 34a has been operated and an imaging instruction has been issued, the process moves on to step S23.

In step S23, the control unit 51 controls the imaging unit 31 to capture a normal still image, and stores the image data subjected to predetermined processing at the image processing unit 52 into a recording medium or the like (not shown), or causes the display unit 34 to display the captured still image. The process then moves on to step S24. Capturing a normal still image is extracting a visible light image from an image captured by the imaging unit 31. If it is determined in step S22 that the operation input unit 34a has not been operated, however, the processing in step S23 is skipped.

In step S24, the control unit 51 controls the imaging unit 31 to capture a normal live view image, and supplies the live view image to the image processing unit 52. The image processing unit 52 performs predetermined image processing, and causes the display unit 34 to display the resultant image as a live view image.

Here, capturing and displaying a normal live view image means extracting visible light images from relatively low resolution images captured at predetermined time intervals by the imaging unit 31, and displaying these images as a moving image with a relatively low frame rate.

In step S21, the control unit 51 determines whether the operation input unit 34a has been operated, and an imaging process end instruction has been issued. If any end instruction has not been issued, the process returns to step S12. Then, if an end instruction has been issued in step S21, the process comes to an end.

If it is determined in step S12 that the captured image has a lower illuminance than the predetermined illuminance and is dark, on the other hand, the process moves on to step S13.

In step S13, the control unit 51 controls the infrared light emitting unit 32 to emit infrared light.

In step S14, the control unit 51 determines whether the operation input unit 34a, which functions as a shutter button, has been displayed as a GUI image beforehand on the display unit 34, and the operation input unit 34a has been operated.

If it is determined in step S14 that the operation input unit 34a has been operated and an imaging instruction has been issued, the process moves on to step S15.

In step S15, the control unit 51 controls the infrared light emitting unit 32 to turn off, and further causes the white light emitting unit 33 to emit strong light.

In step S16, the control unit 51 controls the imaging unit 31 to capture a visible light image, and supplies the visible light image to the image processing unit 52. The process then moves on to step S17.

In step S17, the control unit 51 turns off the white light emitting unit 33, and controls the infrared light emitting unit 32 to emit infrared light. The process then moves on to step S18.

In step S18, the control unit 51 controls the imaging unit 31 to capture a still image as a red light image, and supplies the red light image to the image processing unit 52. The process then moves on to step S19.

In step S19, the image processing unit 52 performs image processing, extracts organs from the red light image by using the supplied visible light image and red light image, corrects the colors for each organ, combines the corrected images, and causes the display unit 34 to display the result of the combination or records the result into a recording medium or the like (not shown). The process then moves on to step S20.

In step S20, the control unit 51 controls the imaging unit 31 to capture a live view image in the dark, and supplies the live view image to the image processing unit 52. The image processing unit 52 performs predetermined image processing, and causes the display unit 34 to display the resultant image as a live view image in the dark. The process then moves on to step S21. Here, capturing and displaying a live view image in the dark means extracting visible light images and infrared light images having relatively low resolutions from images captured at predetermined time intervals, extracting chrominance images from the visible light images, combine the chrominance images with the infrared light images as luminance images, and displaying the resultant images as a color image with a relatively low frame rate.

If it is determined in step S14 that the operation input unit 34a has not been operated, on the other hand, the process moves on to step S20.

<Image Processing>

Figure 5:
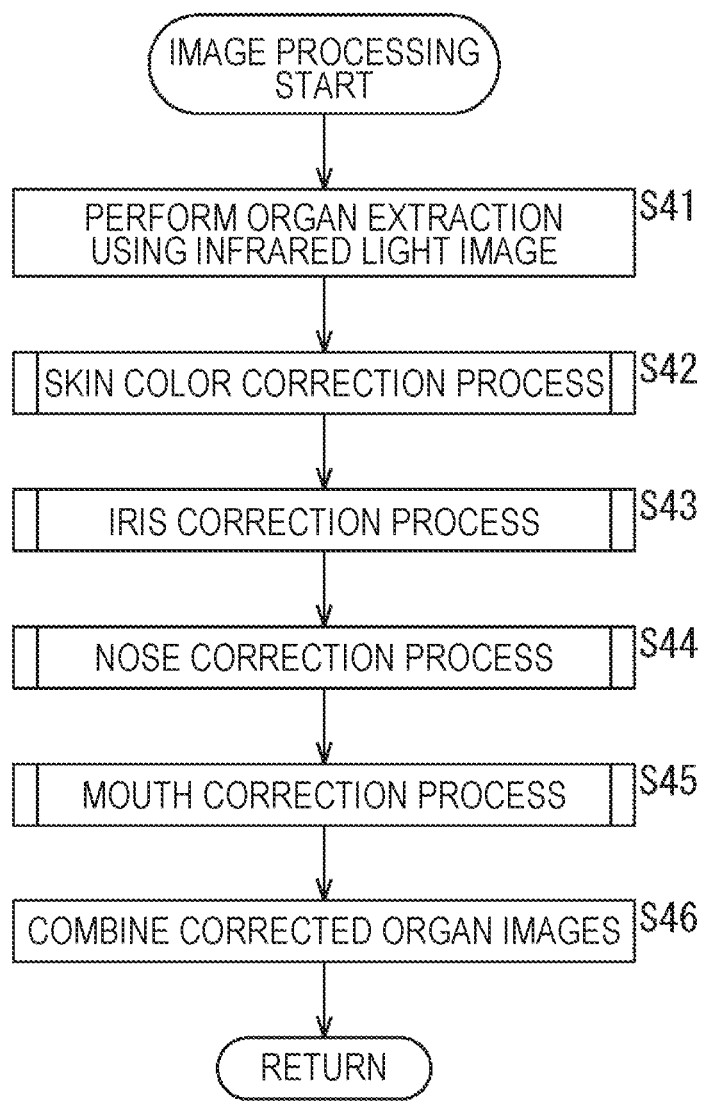
FIG. 5 is a flowchart for explaining the image processing shown in FIG. 4.

Referring now to the flowchart shown in FIG. 5, the image processing in step S19 in the flowchart shown in FIG. 4 is described.

In step S41, the organ extraction unit 71 extracts various kinds of organs such as the skin color, the eyes (irises), the nose, and the mouth, which constitute a face image, using the red light image having the higher SNR between the supplied visible light image and red light image. The organ extraction unit 71 then transmits the extracted skin color image to the skin color correction processing unit 72, the iris image to the iris correction processing unit 73, the nose image to the nose correction processing unit 74, and the mouth image to the mouth correction processing unit 75, respectively.

In step S42, the skin color correction processing unit 72 performs a skin color correction process, to correct the color of the skin color image and supply the resultant image to the organ image combining unit 76. It should be noted that the configuration of the skin color correction processing unit 72 and the skin color correction process will be described later in detail.

In step S43, the iris correction processing unit 73 performs an iris correction process, to correct the color of the iris image and supply the resultant image to the organ image combining unit 76. It should be noted that the configuration of the iris correction processing unit 73 and the iris correction process will be described later in detail.

In step S44, the nose correction processing unit 74 performs a nose correction process, to correct the color of the nose image and supply the resultant image to the organ image combining unit 76.

In step S45, the mouth correction processing unit 75 performs a mouth correction process, to correct the color of the mouth image and supply the resultant image to the organ image combining unit 76.

In step S46, the organ image combining unit 76 reconstructs the face image by combining the skin color image that is supplied from the skin color correction processing unit 72 and has been subjected to the color correction, the iris image that is supplied from the iris correction processing unit 73 and has been subjected to the color correction, the nose image that is supplied from the nose correction processing unit 74 and has been subjected to the color correction, and the mouth image that is supplied from the mouth correction processing unit 75 and has been subjected to the color correction. The organ image combining unit 76 then outputs the reconstructed face image to the display unit 34.

In the above process, in a case where an image is regarded dark after the imaging unit 31 is activated, the processes in steps S12 through S14, S20, and S21 are repeated until the shutter is pressed. That is, until the shutter is pressed, a live view image is repeatedly captured, the infrared light emitting unit 32 repeatedly emits infrared light, the white light emitting unit 33 is repeatedly turned off, and a live view image formed with monochrome images is repeatedly displayed on the display unit 34.

In this process, when it is determined that the operation input unit 34a has been operated and the shutter button has been operated, a series of processes in steps S15 through S19 are carried out, so that a visible light image and a red light image are captured as still images by the imaging unit 31, and the red light image and the visible light image are used to output and display an image in which the color of the face image has been corrected.

As a result, it becomes possible to capture an image in which the color of the face image has been corrected. In the example described above, in a case where an instruction is issued to perform imaging in the dark, the white light emitting unit 33 is caused to emit light, and the infrared light emitting unit 32 is turned off or is caused to emit a small amount of light, so that a visible light image as color information is captured. After that, the white light emitting unit 33 is turned off, and the infrared light emitting unit 32 is caused to emit light, so that an infrared light image as luminance information is captured. However, the order of capturing may be reversed, as long as both a visible light image and an infrared light image can be captured. For example, a visible light image may be captured after an infrared light image is captured.

Alternatively, the infrared light emitting unit 32 and the white light emitting unit 33 may be caused to emit light at the same time, an infrared light image may be generated from the infrared light pixels in the imaging unit 31 in one imaging operation, and a visible light image may be generated from the other visible light pixels (RGB pixels). That is, as long as an infrared light image and a visible light image can be captured, the light emission sequence of the infrared light emitting unit 32 and the white light emitting unit 33 is not limited to any particular sequence. Further, as for dark portions, correction using an infrared light image is performed, and therefore, the white light emitting unit 33 is not necessarily required. A visible light image may be captured using only natural light in the surroundings.

<First Example Configuration of the Skin Color Correction Processing Unit>

Figure 6:
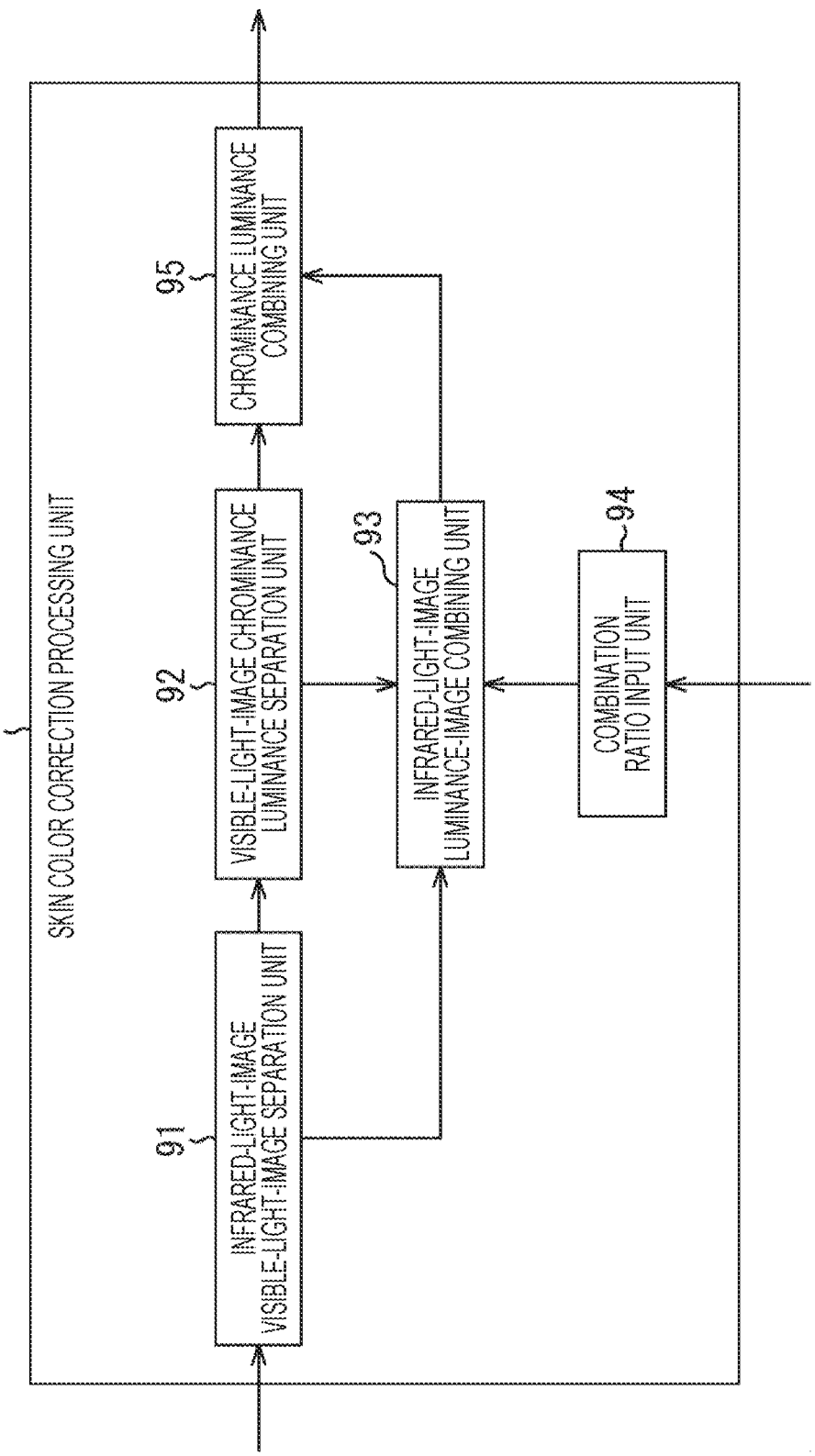
FIG. 6 is a diagram for explaining a first example configuration of the skin color correction processing unit of the image processing unit shown in FIG. 3.

Referring now to the block diagram shown in FIG. 6, a first example configuration of the skin color correction processing unit 72 is described.

The skin color correction processing unit 72 includes an infrared-light-image visible-light-image separation unit 91, a visible-light-image chrominance luminance separation unit 92, an infrared-light-image luminance-image combining unit 93, a combination ratio input unit 94, and a chrominance luminance combining unit 95.

The infrared-light-image visible-light-image separation unit 91 separates a visible light image and an infrared light image that are sequentially supplied, supplies the visible light image to the visible-light-image chrominance luminance separation unit 92, and supplies the infrared light image to the infrared-light-image luminance-image combining unit 93.

The visible-light-image chrominance luminance separation unit 92 separates the supplied visible light image into a luminance component and a chrominance component, supplies the chrominance component to the chrominance luminance combining unit 95, and supplies the luminance component to the infrared-light-image luminance-image combining unit 93.

The infrared-light-image luminance-image combining unit 93 combines the infrared light image and the luminance component at a ratio that is input via the combination ratio input unit 94, and outputs the result as a new luminance component to the chrominance luminance combining unit 95.

In accordance with an operation signal from the operation input unit 34*a* functioning as a touch panel on, for example, a scale that is generated by the control unit 51 and is displayed as a graphical user interface (GUI) on the display unit 34, the combination ratio input unit 94 supplies information indicating the combination ratio between the infrared light image and the luminance component to the control unit 51.

The control unit 51 supplies the ratio information supplied via the operation input unit 34*a* to the combination ratio input unit 94 of the image processing unit. Through such a series of operations, the combination ratio input unit 94 supplies the combination ratio to the infrared-light-image luminance-image combining unit 93.

The chrominance luminance combining unit 95 generates an image by combining the chrominance component supplied from the visible-light-image chrominance luminance separation unit 92 with the luminance component newly set by the infrared-light-image luminance-image combining unit 93, and outputs the image.

<Skin Color Correction Process to be Performed by the Skin Color Correction Processing Unit in FIG. 6>

Figure 7:
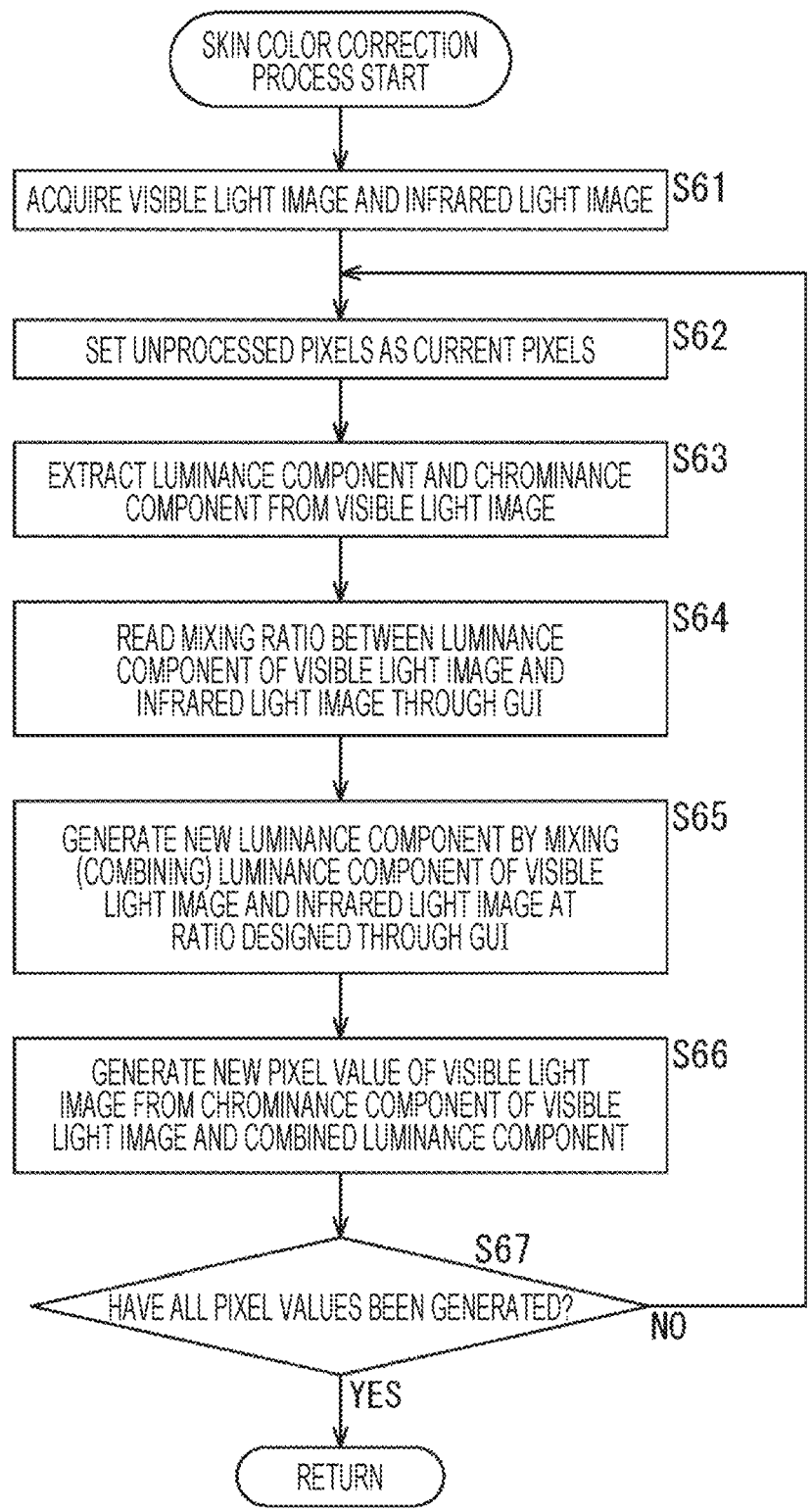
FIG. 7 is a flowchart for explaining a skin color correction process to be performed by the skin color correction processing unit shown in FIG. 6.

Referring now to the flowchart shown in FIG. 7, a skin color correction process to be performed by the skin color correction processing unit 72 shown in FIG. 6 is described.

In step S61, the infrared-light-image visible-light-image separation unit 91 acquires a visible light image and an infrared light image classified as a skin area. That is, the visible light image and the infrared light image captured through the processes in steps S16 and S18 described above with reference to the flowchart shown in FIG. 4 are sequentially acquired.

In step S62, the infrared-light-image visible-light-image separation unit 91 sets the current pixels (target pixels) that are unprocessed pixels among all the pixels of the visible light image and the infrared light image, supplies the target pixel of the visible light image to the visible-light-image separation unit 92, and supplies the target pixel of the infrared light image to the infrared-light-image luminance-image combining unit 93.

In step S63, the visible-light-image chrominance-image separation unit 92 separates the target pixel in the visible light image into a luminance component and a chrominance component, supplies the luminance component to the infrared-light-image luminance-image combining unit 93, and supplies the chrominance component to the chrominance luminance combining unit 95.

Figure 8:
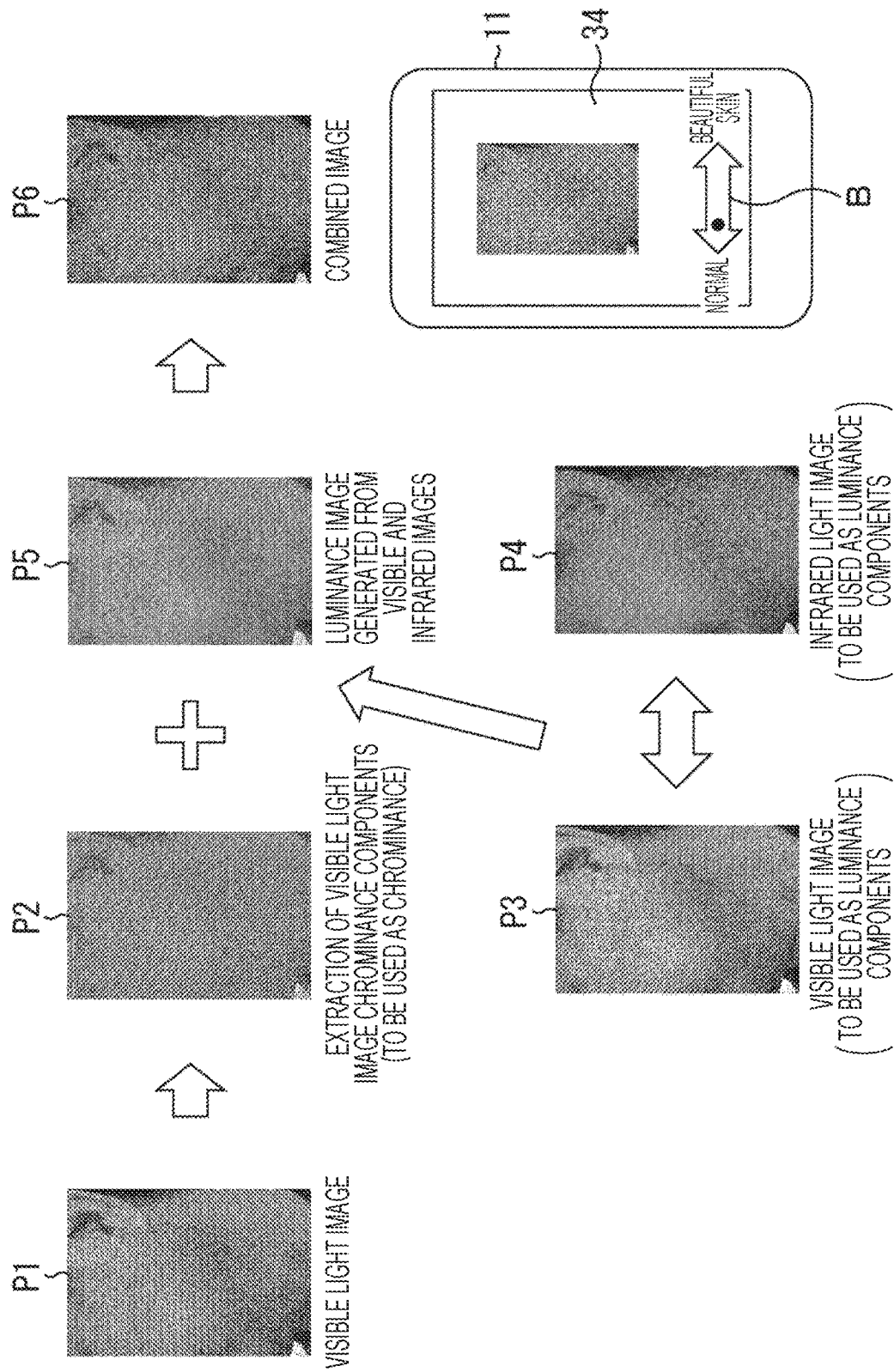
FIG. 8 is a diagram for explaining a skin color correction process to be performed by the skin color correction processing unit shown in FIG. 6.

In step S64, the control unit 51 controls the display unit 34 to display a GUI for designating a mixing ratio between the luminance component in the visible light image and the infrared light image as shown the lower right portion of FIG. 8, for example. The control unit 51 then controls the operation input unit 34*a* to output an operation signal corresponding to an operation input to the displayed GUI, and supplies information indicating the ratio corresponding to the contents of the operation to the combination ratio input unit 94 of the skin color correction processing unit 72.

The combination ratio input unit 94 outputs the combination ratio information to the infrared-light-image luminance-image combining unit 93.

In the lower right portion of FIG. 8, a captured image is displayed on the display unit 34 of the information processing device 11, and a slide bar B for indicating the ratio between the pixel signal of the infrared light image and the luminance component of the visible light image is displayed below the image. By moving the black dot on the slide bar B to left and right in the drawing, the user can set the ratio between the pixel signal of the infrared light image and the luminance component of the visible light image.

In the lower right portion of FIG. 8, the leftward direction is shown as "normal", and the rightward direction is shown as "beautiful skin". That is, as the black dot is moved rightward and becomes closer to "beautiful skin", the ratio of the infrared light image is set at a higher value. Specifically, as the infrared light image is transmitted and reflected through the melanin pigment that causes spots and the like in the skin, the spots become an unnoticeable in the image. Therefore, the higher the ratio of the infrared light image is, the more different the color becomes from the real color. However, it is possible to make the spots and the like inconspicuous and obtain a beautiful skin image.

On the other hand, when the black dot is moved leftward and becomes closer to "normal" in the drawing, the ratio of the luminance component in the visible light image is set at a higher value. That is, as the ratio of the luminance component of the visible light image becomes higher, the image is made more similar to the visible light image.

In step S65, the infrared-light-image luminance-image combining unit 93 combines the infrared light image and the luminance component of the visible light image in accordance with the supplied combination ratio, and outputs the resultant component as a new luminance component to the chrominance luminance combining unit 95.

In step S66, the chrominance luminance combining unit 95 combines the chrominance component supplied from the visible-light-image chrominance luminance separation unit 92 with the newly set luminance component supplied from the infrared-light-image luminance-image combining unit 93, to reconstruct and output the pixels of the visible light image.

In step S67, the infrared-light-image visible-light-image separation unit 91 determines whether there are no more unprocessed images, and the process has been performed on all the pixels. If there is any unprocessed pixel, the process moves on to step S62, and the processing that follows is repeated. That is, the processing in steps S62 through S67 is repeated until the process is performed on all the pixels. Then, if it is determined in step S67 that there are no more unprocessed pixels, the process comes to an end.

That is, as the skin color correction process described above with reference to the flowchart shown in FIG. 7 is performed, the process shown in FIG. 8 is performed.

Specifically, a visible light image P1 shown in the upper left portion of FIG. 8 is divided into an image P2 formed with chrominance components and an image P3 formed with luminance components on a pixel-by-pixel basis. Then, the image P3 formed with the luminance components of the visible light image and the infrared light image P4 are combined with the combination ratio set through a GUI as shown in the lower left portion of FIG. 8, so that an image P5 formed with new luminance components is generated. The image P2 formed with the chrominance components and the image P5 formed with the new luminance components are combined, so that a combined image P6 is generated.

The combined image P6 is displayed on the display unit 34 of the information processing device 11 shown in the lower left portion.

At this stage, the user changes the position of the black dot on the slide bar B while watching the image displayed on the display unit 34. In this manner, image processing can be performed while the combination ratio between the luminance components of the visible light image and the infrared light image is changed.

In the example described above, the combination ratio is changed on a pixel-by-pixel basis. However, after processing is performed on all the pixels with a predetermined combination ratio, the user may perform the check, and the skin color correction process may be repeated while the combination ratio is changed as necessary. Through such processing, it is possible to repeat the skin color correction process while changing the combination ratio as many as the user likes.

Also, as infrared light is transmitted and reflected through the melanin pigment that causes skin spots and the like, an infrared light image is an image in which skin spots are inconspicuous, and thus, a higher skin whitening effect can be achieved. That is, with a process using an infrared light image, a skin color whitening effect can be expected. Therefore, the skin color correction process is not necessarily performed in the dark, and may be performed when the surroundings of the object are bright. Even in that case, the skin color can be appropriately corrected, and the skin whitening effect can be increased.

Furthermore, since the skin whitening effect can be enhanced even in the dark, it is also possible to enhance the skin whitening effect for skin portions darkened due to backlight, for example. In this case, the ambient external light is often sufficiently bright, and therefore, there is a possibility that darkness is not recognized at the time of imaging. However, as the above described skin color correction process is performed on locally darkened portions, the skin color can be appropriately corrected, and the whitening effect can be further increased.

<Second Example Configuration of the Skin Color Correction Processing Unit>

In the example described above, the user sets the combination ratio between an infrared light image and the luminance component of a visible light image. However, the skin color may be corrected without any user intervention, in accordance with the magnitude relationship between the infrared light image and the luminance component of the visible light image, and whether the luminance component of the visible light image is achromatic.

Figure 9:
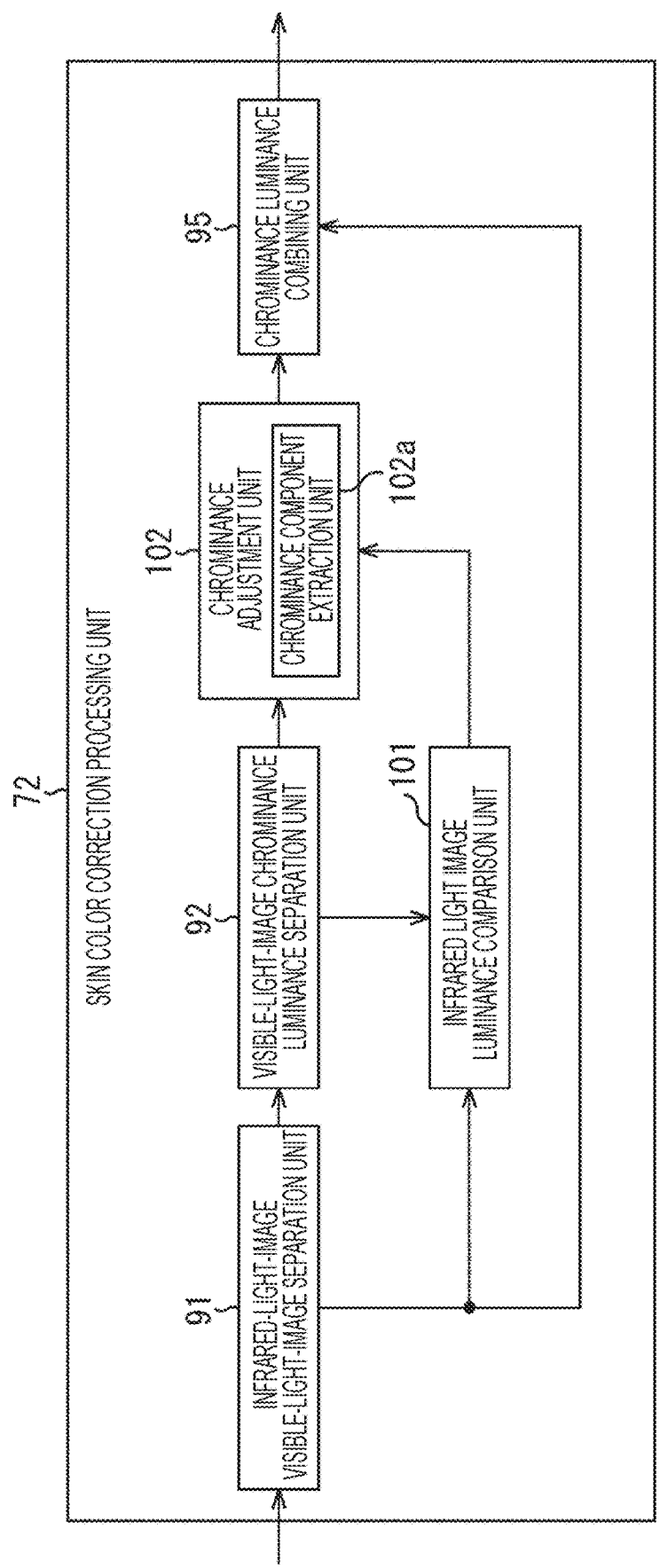
FIG. 9 is a diagram for explaining a second example configuration of the skin color correction processing unit of the image processing unit shown in FIG. 3.

FIG. 9 shows an example configuration of the skin color correction processing unit 72 designed to correct the skin color without any user intervention. It should be noted that components having the same functions as those shown in the skin color correction processing unit 72 shown in FIG. 6 have the same names and the same reference numerals as those in FIG. 6, and explanation of them will not be made below.

Specifically, the skin color correction processing unit 72 shown in FIG. 9 differs from the skin color correction processing unit 72 shown in FIG. 6 in that an infrared light luminance comparison unit 101 and a chrominance adjustment unit 102 are provided, instead of the infrared-light-image luminance-image combining unit 93 and the combination ratio input unit 94.

The infrared light luminance comparison unit 101 compares the magnitude of the infrared light image and the magnitude of the luminance component of the visible light image on a pixel-by-pixel basis, and supplies a comparison result to the chrominance adjustment unit 102.

In accordance with the comparison result supplied from the infrared light luminance comparison unit 101 and the magnitude relationship between the luminance component of the visible light image and the achromatic color determination threshold, the chrominance adjustment unit 102 adjusts the chrominance supplied from the visible-light-image chrominance luminance separation unit 92, and outputs the result to the chrominance luminance combining unit 95. The chrominance adjustment unit 102 includes a chrominance component extraction unit 102a. In a case where the luminance component of the visible light image of the current pixel is smaller than the achromatic color determination threshold, and the current pixel is regarded as an achromatic pixel, the chrominance around the current pixel of the visible light image is extracted through a filtering process, for example, and is replaced with the chrominance of the current pixel.

<Skin Color Correction Process to be Performed by the Skin Color Correction Processing Unit in FIG. 9>

Figure 10:
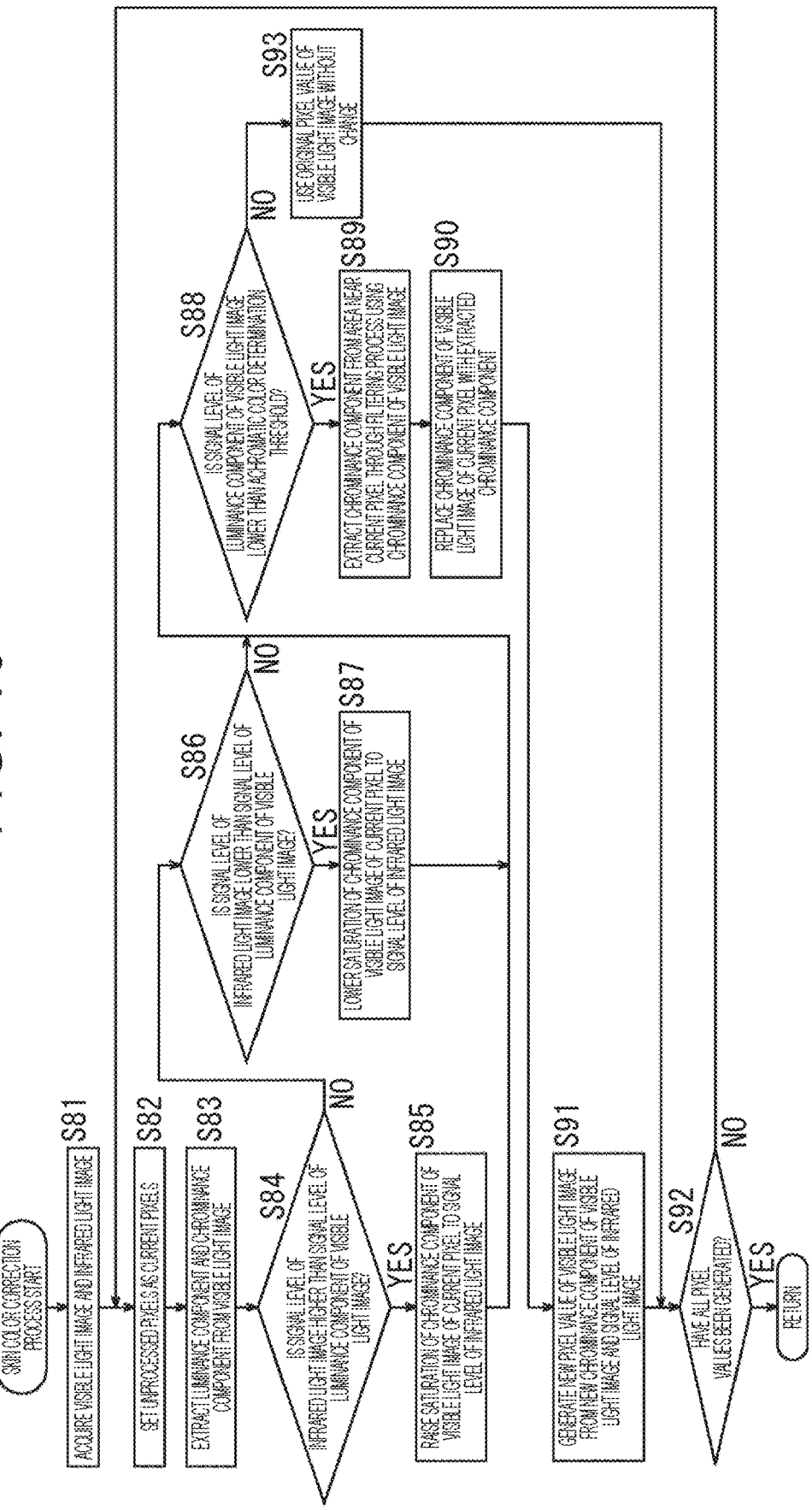
FIG. 10 is a flowchart for explaining a skin color correction process to be performed by the skin color correction processing unit shown in FIG. 9.

Referring now to the flowchart shown in FIG. 10, a skin color correction process to be performed by the skin color correction processing unit 72 shown in FIG. 9 is described.

In step S81, the infrared-light-image visible-light-image separation unit 91 acquires a visible light image and an infrared light image classified as a skin area. That is, the visible light image and the infrared light image captured through the processes in steps S16 and S18 described above with reference to the flowchart shown in FIG. 4 are sequentially acquired.

In step S82, the infrared-light-image visible-light-image separation unit 91 sets the current pixels (target pixels) that are unprocessed pixels among all the pixels of the visible light image and the infrared light image, supplies the target pixel of the visible light image to the visible-light-image chrominance luminance separation unit 92, and supplies the target pixel of the infrared light image to the infrared light luminance comparison unit 101 and the chrominance luminance combining unit 95.

In step S83, the visible-light-image chrominance-image separation unit 92 separates the target pixel in the visible light image into a luminance component and a chrominance component, supplies the luminance component to the infrared light luminance comparison unit 101, and supplies the chrominance component to the chrominance adjustment unit 102.

In step S84, the infrared light luminance comparison unit 101 determines whether the signal level of the infrared light image is higher than the signal level of the luminance component of the visible light image, and supplies a determination result to the chrominance adjustment unit 102. If the signal level of the infrared light image is higher than the signal level of the luminance component of the visible light image in step S84, for example, the process moves on to step S85.

In step S85, the chrominance adjustment unit 102 raises the saturation of the chrominance component of the visible light image of the current pixel so as to match the signal level of the infrared light image, and supplies the raised saturation to the chrominance luminance combining unit 95. The process then moves on to step S88. For example, the chrominance adjustment unit 102 increases the saturation of the color component by the amount equivalent to the ratio of the signal level of the infrared light image to the signal level of the luminance component of the visible light image.

If the signal level of the infrared light image is determined not to be higher than the signal level of the luminance component of the visible light image in step S84, on the other hand, the process move on to step S86.

In step S86, the infrared light luminance comparison unit 101 determines whether the signal level of the infrared light image is lower than the signal level of the luminance component of the visible light image, and supplies a determination result to the chrominance adjustment unit 102. If the signal level of the infrared light image is lower than the signal level of the luminance component of the visible light image in step S86, for example, the process moves on to step S87.

In step S87, the chrominance adjustment unit 102 lowers the saturation of the chrominance component of the visible light image of the current pixel so as to match the signal level of the infrared light image, and supplies the lowered saturation to the chrominance luminance combining unit 95. The process then moves on to step S88. For example, the chrominance adjustment unit 102 lowers the saturation of the color component by the amount equivalent to the ratio of the signal level of the infrared light image to the signal level of the luminance component of the visible light image.

Further, if the signal level of the infrared light image is not lower than the signal level of the luminance component of the visible light image in step S86, for example, the process moves on to step S88.

In step S88, the infrared light luminance comparison unit 101 determines whether the signal level of the luminance component of the visible light image is lower than the achromatic color determination threshold, and supplies a determination result to the chrominance adjustment unit 102. If the signal level of the luminance component of the visible light image is lower than the achromatic color determination threshold in step S88, for example, the process moves on to step S89.

In step S89, the chrominance adjustment unit 102 controls the chrominance component extraction unit 102a to extract the chrominance component from a pixel near the current pixel of the visible light image through a filtering process.

In step S90, the chrominance adjustment unit 102 replaces the chrominance component of the current pixel with the chrominance component extracted from the nearby pixel, and supplies the resultant chrominance component to the chrominance luminance combining unit 95. The process then moves on to step S91.

In step S91, the chrominance luminance combining unit 95 combines the chrominance component supplied from the chrominance adjustment unit 102 with the luminance component supplied from the infrared-light-image visible-light-image separation unit 91, to reconstruct and output the pixels of the visible light image. The process then moves on to step S92.

Further, if the signal level of the luminance component of the visible light image is determined not to be lower than the achromatic color determination threshold in step S88, the process moves on to step S93.

In step S93, the chrominance adjustment unit 102 outputs the chrominance component of the visible light image to the chrominance luminance combining unit 95 without any change. The chrominance luminance combining unit 95 then reproduces the pixels of the input visible light image from the chrominance component and the luminance component of the visible light image, and outputs the reproduced pixels as they are. The process then moves on to step S92.

In step S92, the infrared-light-image visible-light-image separation unit 91 determines whether there are no more unprocessed images, and the process has been performed on all the pixels. If there is ant unprocessed pixel, the process moves on to step S82, and the processing that follows is repeated. That is, the processing in steps S82 through S92 is repeated until the process is performed on all the pixels. Then, if it is determined in step S92 that there are no more unprocessed pixels, the process comes to an end.

In the above described process, the chrominance component is made equal to the signal level of the infrared light image, in accordance with the magnitude relationship between the infrared light image and the luminance component of the visible light image, and whether the luminance component of the visible light is so low as to be regarded as achromatic. Alternatively, the chrominance component is replaced with a chrominance component extracted from a pixel near the current pixel through a filtering process.

As a result, the chrominance component can be adjusted with the infrared light image and the luminance component of the visible light image without user intervention, and the skin color can be corrected. It should be noted that, since infrared light is transmitted and reflected through the melanin pigment that causes spots in the skin and the like, an infrared light image is an image in which spots are inconspicuous as described above. In view of this, the skin color correction process in this case is not necessarily performed in the dark, and a skin whitening effect can be achieved through the skin color correction process performed when the surroundings of the object are bright. Likewise, by skin color correction, it is also possible to appropriately correct the skin color of portions darkened by backlight.

<First Example Configuration of the Iris Correction Processing Unit>

Figure 11:
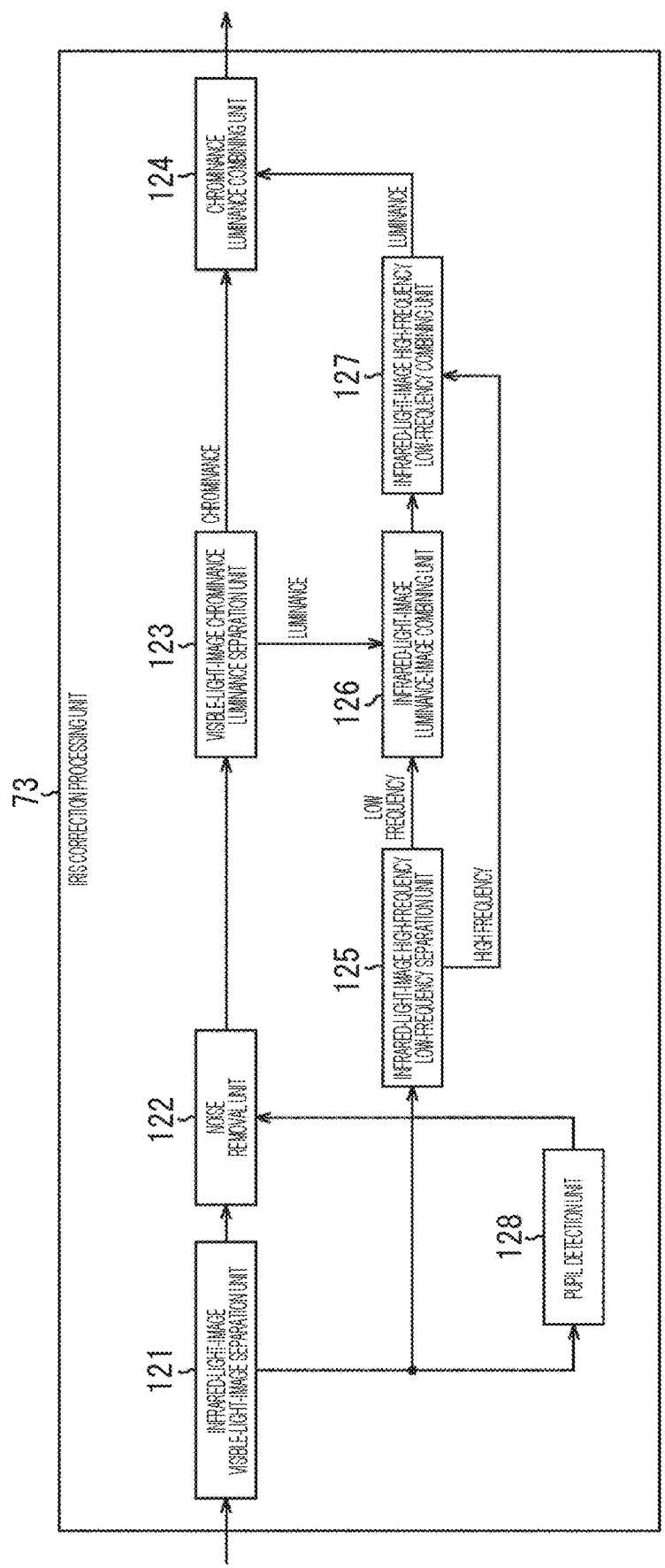
FIG. 11 is a diagram for explaining a first example configuration of the iris correction processing unit of the image processing unit shown in FIG. 3.

Referring now to the block diagram shown in FIG. 11, a first example configuration of the iris correction processing unit 73 is described.

The iris correction processing unit 73 includes an infrared-light-image visible-light-image separation unit 121, a noise removal unit 122, a visible-light-image chrominance luminance separation unit 123, a chrominance luminance combining unit 124, an infrared-light-image high-frequency low-frequency separation unit 125, an infrared-light-image luminance-image combining unit 126, an infrared-light-image high-frequency low-frequency combining unit 127, and a pupil detection unit 128.

The infrared-light-image visible-light-image separation unit 121 separates a visible light image and an infrared light image that are sequentially supplied, supplies the visible light image to the noise removal unit 122, and supplies the infrared light image to the infrared-light-image high-frequency low-frequency separation unit 125 and the pupil detection unit 128.

In accordance with the infrared light image with a high SNR, the pupil detection unit 128 detects the positions and the shapes of the pupils, and supplies a detection result to the noise removal unit 122.

In accordance with the information about the pupil positions and shapes supplied from the pupil detection unit 128, the noise removal unit 122 forms a noise filter corresponding to the pupil positions and shapes, removes noise from the visible light image, and supplies the noise-removed visible light image to the visible-light-image chrominance luminance separation unit 123.

The visible-light-image chrominance luminance separation unit 123 separates the noise-removed visible light image into a chrominance component and a luminance component, supplies the chrominance component to the chrominance luminance combining unit 124, and supplies the luminance component to the infrared-light-image luminance-image combining unit 126.

The infrared-light-image high-frequency low-frequency separation unit 125 separates the infrared light image supplied from the infrared-light-image visible-light-image separation unit 121 into a high-frequency component and a low-frequency component, and supplies the high-frequency component to the infrared-light-image high-frequency low-frequency combining unit 127, and supplies the low-frequency component to the infrared-light-image luminance-image combining unit 126.

The infrared-light-image luminance-image combining unit 126 modulates the signal level of the low-frequency component of the infrared light image in accordance with the signal level of the luminance component of the visible light image, and supplies the modulated low-frequency component to the infrared-light-image high-frequency low-frequency combining unit 127.

The infrared-light-image high-frequency low-frequency combining unit 127 combines the low-frequency component of the infrared light image modulated in accordance with the signal level of the luminance component of the visible light image, with the high-frequency component of the infrared light image, to generate an infrared light image. The generated infrared light image is supplied as the luminance component of the visible light image to the chrominance luminance combining unit 124.

The chrominance luminance combining unit 124 combines the infrared light image supplied as a luminance component from the infrared-light-image high-frequency low-frequency combining unit 127 with the chrominance component supplied from the visible-light-image chrominance luminance separation unit 123, and outputs an image in which the irises have been corrected.

<Iris Correction Process to be Performed by the Iris Correction Processing Unit in FIG. 11>

Figure 12:
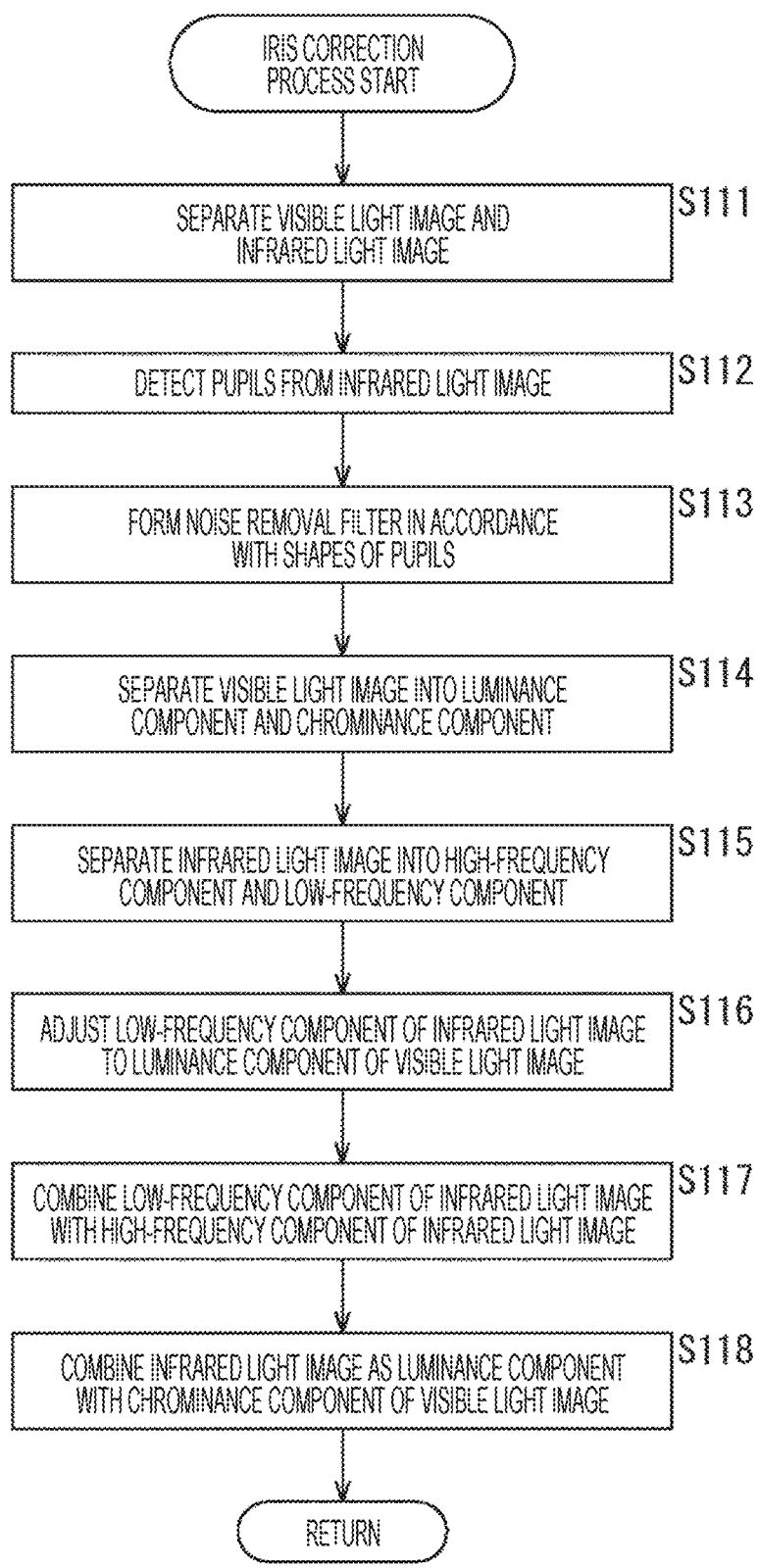
FIG. 12 is a flowchart for explaining an iris correction process to be performed by the iris correction processing unit shown in FIG. 11.

Referring now to the flowchart shown in FIG. 12, an iris correction process to be performed by the iris correction processing unit 73 shown in FIG. 11 is described.

In step S111, the infrared-light-image visible-light-image separation unit 121 separates a visible light image and an infrared light image that are sequentially supplied, supplies the visible light image to the noise removal unit 122, and supplies the infrared light image to the infrared-light-image high-frequency low-frequency separation unit 125 and the pupil detection unit 128.

In step S112, the pupil detection unit 128 detects the positions and the shapes of the pupils in accordance with the infrared light image with a high SNR, and supplies a detection result to the noise removal unit 122.

In step S113, in accordance with the information about the pupil positions and shapes supplied from the pupil detection unit 128, the noise removal unit 122 forms a noise filter corresponding to the positions and the shapes of the pupils in the visible light image, removes noise from the visible light image, and supplies the noise-removed visible light image to the visible-light-image chrominance luminance separation unit 123.

In step S114, the visible-light-image chrominance luminance separation unit 123 separates the noise-removed visible light image into a chrominance component and a luminance component, supplies the chrominance component to the chrominance luminance combining unit 124, and supplies the luminance component to the infrared-light-image luminance-image combining unit 126.

In step S115, the infrared-light-image high-frequency low-frequency separation unit 125 separates the infrared light image supplied from the infrared-light-image visible-light-image separation unit 121 into a high-frequency component and a low-frequency component, and supplies the high-frequency component to the infrared-light-image high-frequency low-frequency combining unit 127, and supplies the low-frequency component to the infrared-light-image luminance-image combining unit 126.

In step S116, the infrared-light-image luminance-image combining unit 126 modulates the signal level of the low-frequency component of the infrared light image in accordance with the signal level of the luminance component of the visible light image, and supplies the modulated low-frequency component to the infrared-light-image high-frequency low-frequency combining unit 127.

In step S117, the infrared-light-image high-frequency low-frequency combining unit 127 combines the low-frequency component of the infrared light image modulated in accordance with the signal level of the luminance component of the visible light image, with the high-frequency component of the infrared light image, to generate an infrared light image. The generated infrared light image is supplied as the luminance component of the visible light image to the chrominance luminance combining unit 124.

In step S118, the chrominance luminance combining unit 124 combines the infrared light image supplied as a luminance component from the infrared-light-image high-frequency low-frequency combining unit 127 with the chrominance component supplied from the chrominance extraction unit 123, to generate a visible light image. This visible light image is output as an image in which the irises have been corrected.

Figure 13:
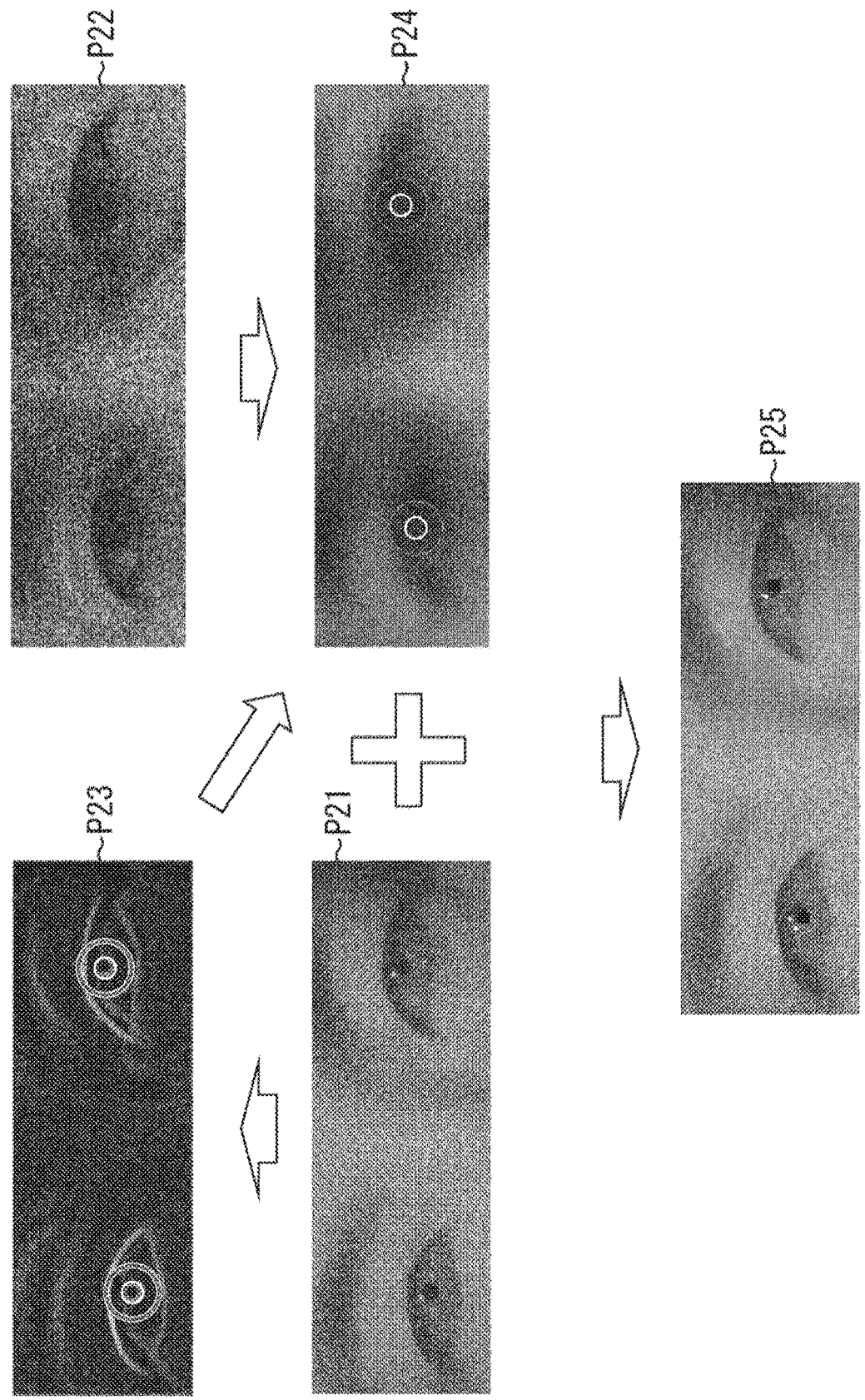
FIG. 13 is a diagram for explaining an iris correction process to be performed by the iris correction processing unit shown in FIG. 11.

Specifically, in a case where an image P21 formed with an infrared light image and an image P22 formed with a visible light image as shown in FIG. 13 are supplied through the above describe process, for example, the positions and the shapes of the pupils are detected from the image P21 through the processing in step S111, as shown in an image P23. It should be noted that, in the image P23, the shapes of the pupils are indicated by two circular marks.

Further, through the processing in step S113, a noise removal filter corresponding to the shapes of the pupils is formed, and noise is removed from the image P22 formed with the visible light image, so that a visible light image shown as an image P24 is generated.

A chrominance component is then extracted from the noise-removed image P24, and is combined with the image P21 formed with the infrared light image as a luminance component, so that an image shown as an image P25 is generated.

As a result, blurring of the outlines of the pupils can be reduced even in the dark.

<Second Example Configuration of the Iris Correction Processing Unit>

In the example described above, a chrominance component extracted from a visible light image from which noise has been removed by a noise removal filter in conformity with the positions and the shapes of the pupils is combined with an infrared light image as a luminance component, to correct the irises of the pupils. However, it is also possible to preset colors for the pupils beforehand so that a desired color can be selected and used for the pupils.

Figure 14:
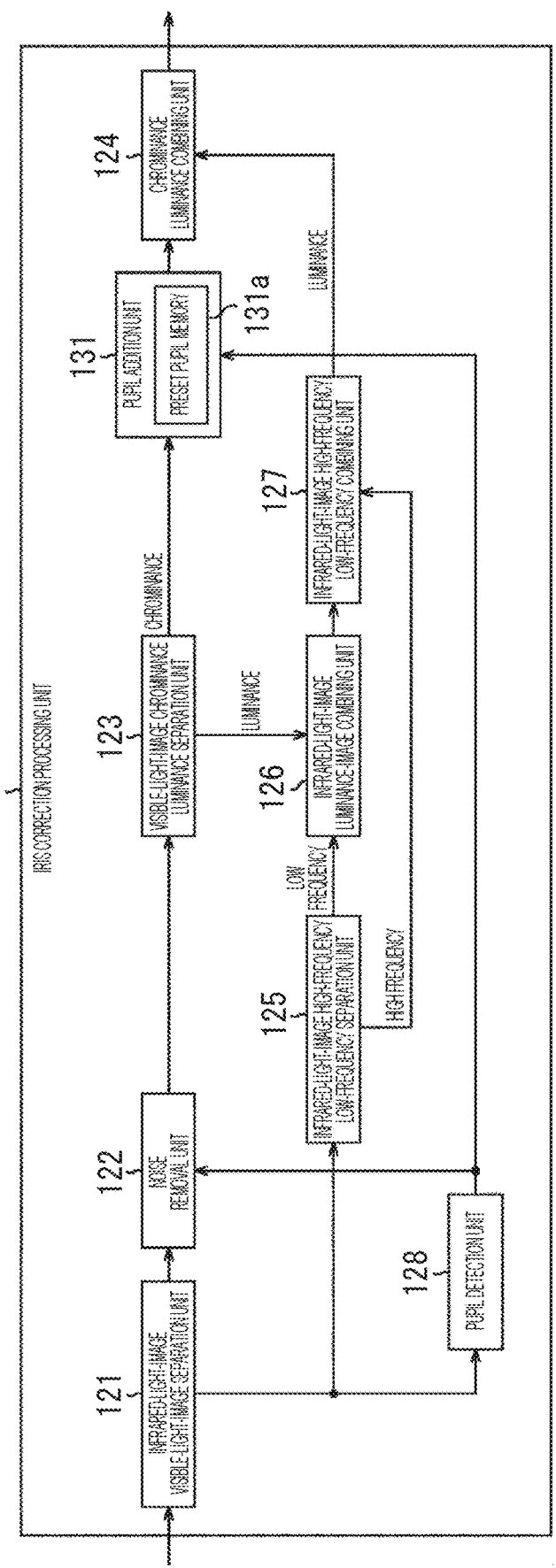
FIG. 14 is a diagram for explaining a second example configuration of the iris correction processing unit of the image processing unit shown in FIG. 3.

FIG. 14 shows an example configuration of the iris correction processing unit 73 in which colors for the pupils are preset so that a desired color can be selected and used for the pupils. It should be noted that, in the configuration of the iris correction processing unit 73 in FIG. 14, components having the same functions as those shown in the iris correction processing unit 73 shown in FIG. 11 have the same reference numerals and the same names as those in FIG. 11, and explanation of them will not be made below.

Specifically, the iris correction processing unit 73 shown in FIG. 14 differs from the iris correction processing unit 73 shown in FIG. 11 in further including a pupil addition unit 131.

In accordance with pupil positions and shapes detected by the pupil detection unit 128, the pupil addition unit 131 adds a pupil chrominance component that is preset in a preset pupil memory 131*a*, to the chrominance component of a visible light image. As for preset pupil chrominance components, various colors such as brown, blue, hazel, gray, green, and violet are set so that the user can select a color in advance. In the description below, one of the pupil colors has been selected in advance. However, for example, the color of the pupils may be changed, and a color may be selected from images showing pupils in various colors.

<Iris Correction Process to be Performed by the Iris Correction Processing Unit in FIG. 14>

Figure 15:
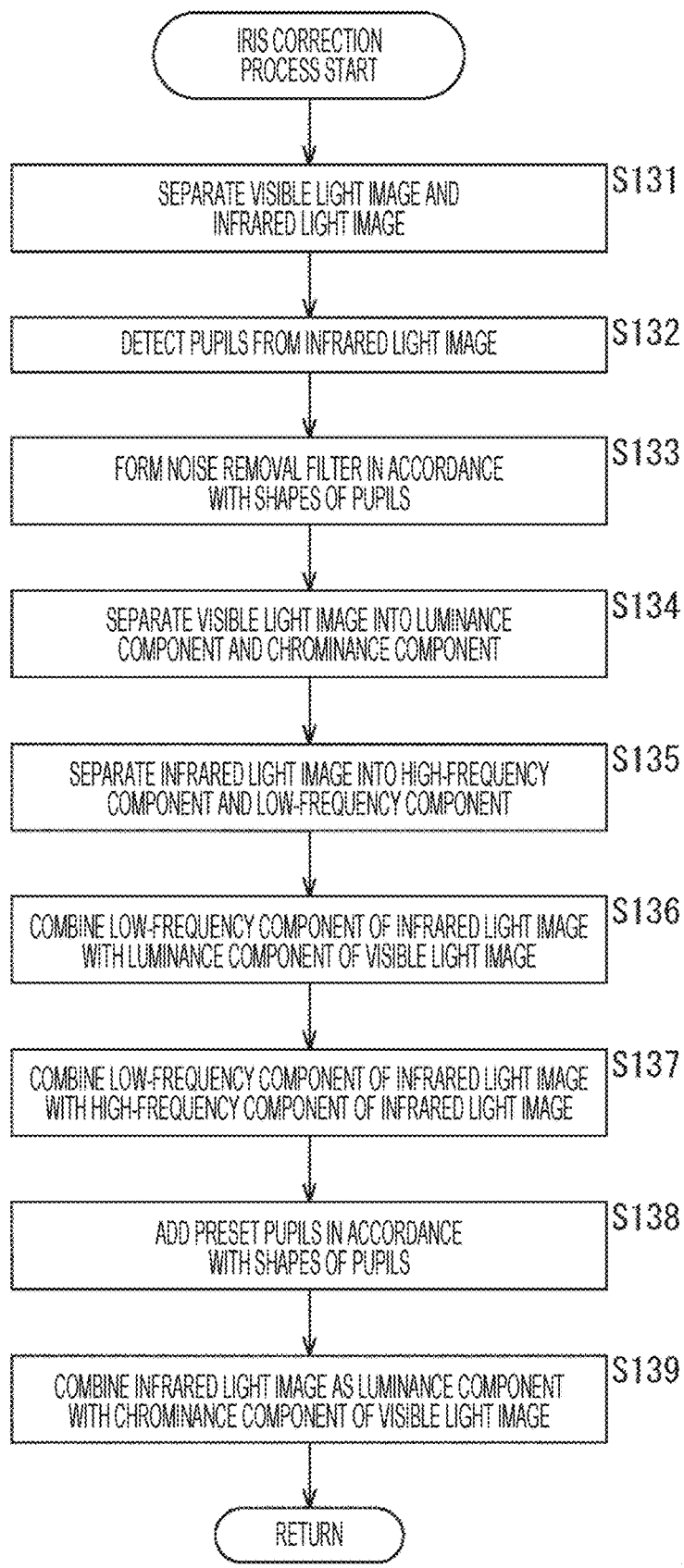
FIG. 15 is a flowchart for explaining an iris correction process to be performed by the iris correction processing unit shown in FIG. 14.

Referring now to the flowchart shown in FIG. 15, an iris correction process to be performed by the iris correction processing unit 73 shown in FIG. 14 is described. The processing in steps S131 through S137 and S139 in the flowchart shown in FIG. 15 is similar to the processing in steps S111 through S118 described with reference to the flowchart shown in FIG. 12, and therefore, explanation thereof is not repeated herein.

Specifically, through the processing in steps S131 through S137, a chrominance component extracted from a visible light image from which noise has been removed by a noise removal filter in conformity with the positions and shapes of the pupils is combined with an infrared light image as a luminance component. After that, the process moves on to step S138.

In step S138, the pupil addition unit 131 reads out a predetermined pupil chrominance component from among the pupil chrominance components preset in the preset pupil memory 131*a*, and adds the predetermined pupil chrominance component in the positions and the shapes detected by the pupil detection unit 128, to the chrominance component of the visible light image. After this processing, in step S139, the chrominance component of the visible light image is combined with a luminance component formed with the infrared light image, and the resultant image is output.

Figure 16:
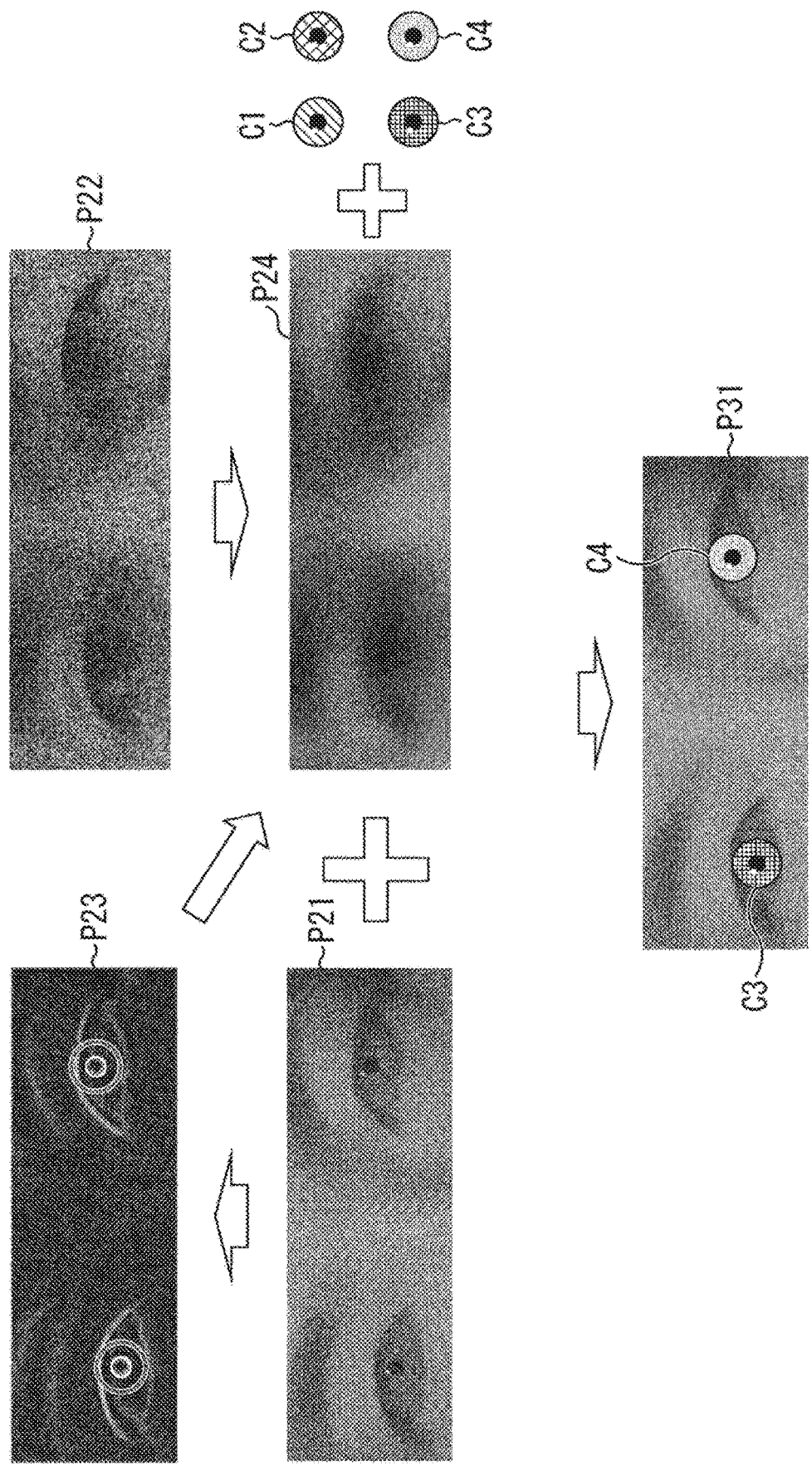
FIG. 16 is a diagram for explaining an iris correction process to be performed by the iris correction processing unit shown in FIG. 14.

That is, as shown in an image P31 in FIG. 16, after a chrominance component extracted from a visible light image from which noise has been removed by a noise removal filter in conformity with the positions and the shapes of the pupils is combined with an infrared light image as a luminance component, one of pupils C1 through C4 preset in the preset pupil memory 131*a* is added in conformity with the positions and the shapes of the pupils.

In the example shown in the image P31 in FIG. 16, the pupil on the left side is the pupil C3, and the pupil on the right side is the pupil C4. However, the same eye may be used for both eyes, or some other pupils may be used.

Through the above described process, pupils in desired colors can be switched while the irises are corrected.

<Third Example Configuration of the Iris Correction Processing Unit>

In the example described above, the pupil addition unit 131 adds a pupil chrominance component preset in the preset pupil memory 131*a* to the chrominance component of a visible light image in accordance with the pupil positions and shapes detected by the pupil detection unit 128. However, as for the information about the pupils that are preset in advance, not only the chrominance components but also the luminance components may be preset so that the respective components can be added to chrominance components and luminance components.

Figure 17:
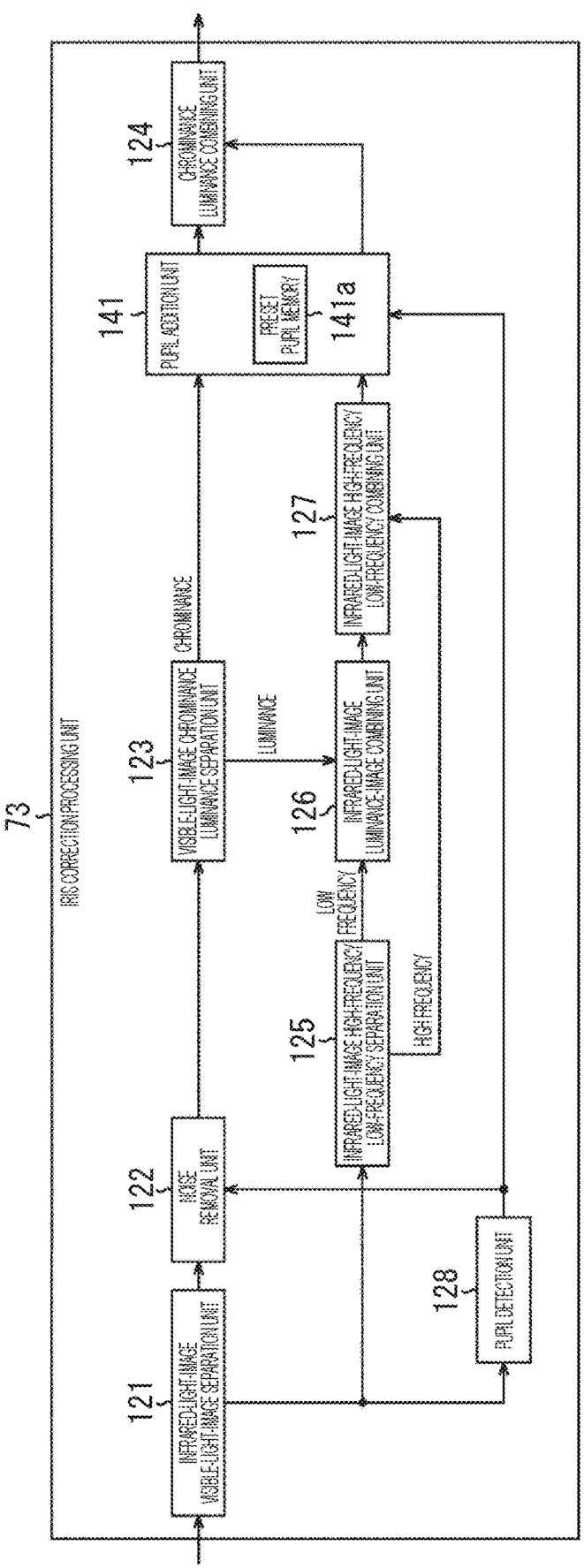
FIG. 17 is a diagram for explaining a third example configuration of the iris correction processing unit of the image processing unit shown in FIG. 3.

FIG. 17 shows a third example configuration of the iris correction processing unit 73 that has chrominance components and luminance components as the information about the pupils that are preset in advance, and add the chrominance components and the luminance components of the respective pupils in accordance with pupil positions and shapes detected by the pupil detection unit 128. It should be noted that, in the configuration of the iris correction processing unit 73 in FIG. 17, components having the same functions as those shown in the iris correction processing unit 73 shown in FIG. 14 have the same reference numerals and the same names as those in FIG. 14, and explanation of them will not be made below.

Specifically, the iris correction processing unit 73 shown in FIG. 17 differs from the iris correction processing unit 73 shown in FIG. 14 in that the pupil addition unit 131 is replaced with a pupil addition unit 141.

Basically, the function of the pupil addition unit 141 is similar to that of the pupil addition unit 131, except that a chrominance component and a luminance component preset in a preset pupil memory 141*a* are added to the chrominance component and the luminance component of a visible light image, respectively. That is, in this case, after a chrominance component and a luminance component that are preset are added to the chrominance component and the luminance component of a visible light image, respectively, the chrominance component and the luminance component are combined. It should be noted that an iris correction process in the configuration correction processing unit 73 in FIG. 17 is basically similar to the process described above with reference to the flowchart shown in FIG. 15, and therefore, explanation thereof is not made herein.

In this case, however, in step S138, the pupil addition unit 141 reads out a pupil chrominance component and a pupil luminance component preset in the preset pupil memory 141*a*, and adds the pupil chrominance component and the pupil luminance component to the chrominance component and the luminance component of a visible light image, respectively, in accordance with pupil positions and shapes detected by the pupil detection unit 128.

<Fourth Example Configuration of the Iris Correction Processing Unit>

In the examples described above, a chrominance component extracted from a visible light image from which noise has been removed by a noise removal filter in conformity with the positions and the shapes of the pupils is combined with an infrared light image as a luminance component to correct the irises of the pupils, and further, a pupil in a desired color may be added. However, an iris color similar to a preset pupil may be selected as an iris color in which the signal level of an infrared light image at the portions of the pupils after correction becomes higher.

Figure 18:
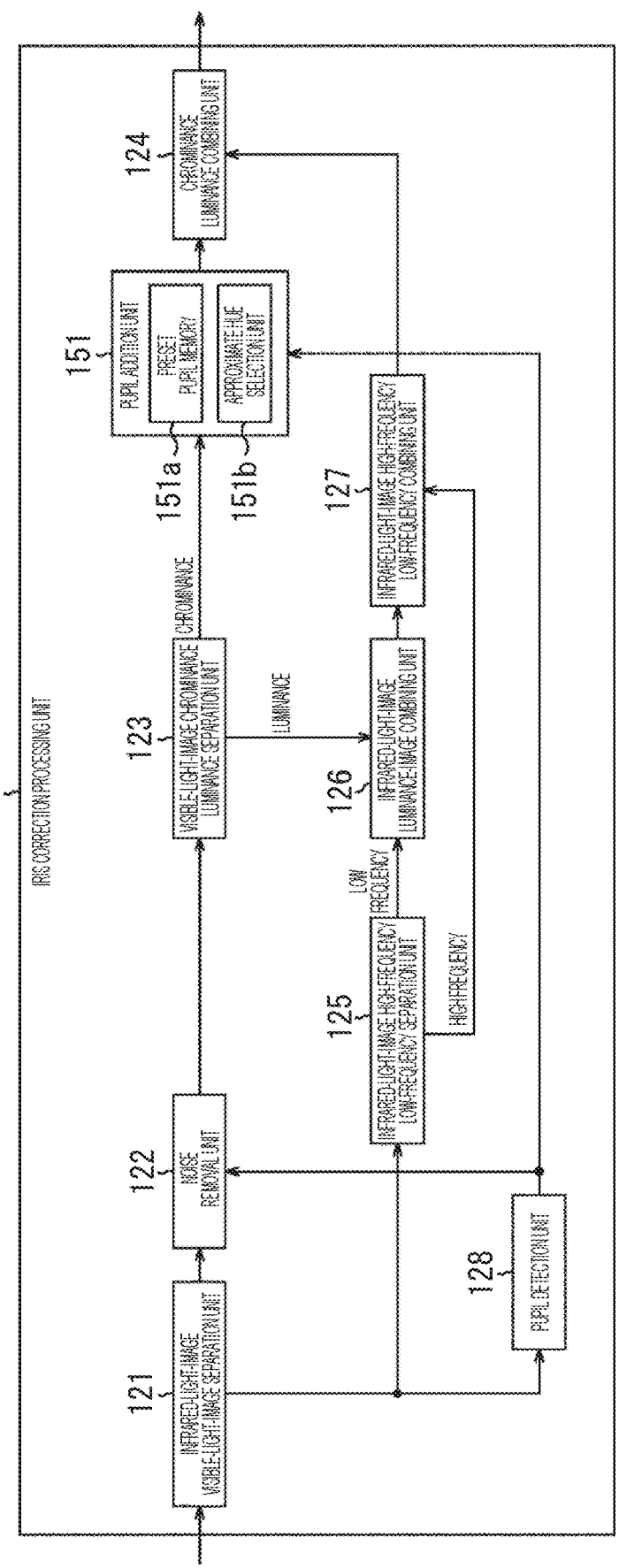
FIG. 18 is a diagram for explaining a fourth example configuration of the iris correction processing unit of the image processing unit shown in FIG. 3.

FIG. 18 shows an example configuration of the iris correction processing unit 73 that is designed to be able to select an iris color similar to a preset pupil as an iris color in which the signal level of an infrared light image at the portions of the pupils after correction becomes higher. It should be noted that, in the configuration of the iris correction processing unit 73 in FIG. 18, components having the same functions as those shown in the iris correction processing unit 73 shown in FIG. 14 have the same reference numerals and the same names as those in FIG. 14, and explanation of them will not be made below.

Specifically, the iris correction processing unit 73 shown in FIG. 18 differs from the iris correction processing unit 73 shown in FIG. 14 in that the pupil addition unit 131 is replaced with a pupil addition unit 151.

The basic function of the pupil addition unit 151 is similar to that of the pupil addition unit 131, but an approximate hue selection unit 151b is provided as well as a preset pupil memory 151a. It should be noted that the function of the preset pupil memory 151a is similar to that of the preset pupil memory 131a, and pupils in a plurality of colors are preset therein.

The approximate hue selection unit 151b extracts the color of the positions and the shapes of the pupils from the corrected image, selects the pupil having the most similar color among the preset chrominance components, and adds the selected pupil to the chrominance component in accordance with the positions and the shapes of the pupils.

<Iris Correction Process to be Performed by the Iris Correction Processing Unit in FIG. 18>

Figure 19:
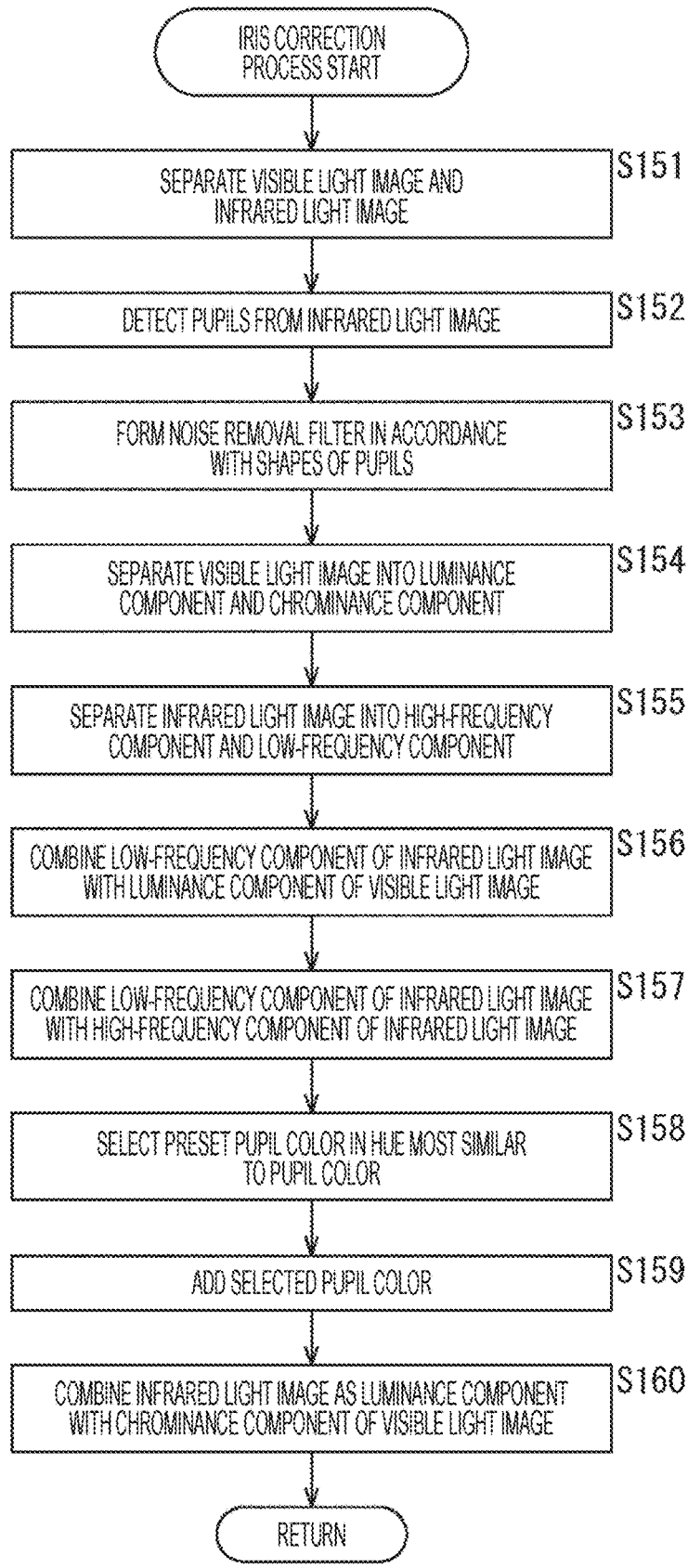
FIG. 19 is a flowchart for explaining an iris correction process to be performed by the iris correction processing unit shown in FIG. 18.

Referring now to the flowchart shown in FIG. 19, an iris correction process to be performed by the iris correction processing unit 73 shown in FIG. 18 is described. The processing in steps S151 through S157 and S160 in the flowchart shown in FIG. 19 is similar to the processing in steps S131 through S137 and S139 described with reference to the flowchart shown in FIG. 15, and therefore, explanation thereof is not repeated herein.

Specifically, through the processing in steps S151 through S157, a chrominance component extracted from a visible light image from which noise has been removed by a noise removal filter in conformity with the positions and shapes of the pupils is combined with an infrared light image as a luminance component. After that, the process moves on to step S158.

In step S158, the pupil addition unit 151 controls the approximate hue selection unit 141b so that the pupil in the color most similar to the color of the area corresponding to the positions and shapes of the pupils in the chrominance component of the visible light image is selected from among the pupil chrominance components preset in the preset pupil memory 151a.

In step S159, the pupil addition unit 151 adds the chrominance component of the pupil in the selected color to the chrominance component in the detected positions and shapes of the pupils. After that, in step S160, the chrominance component to which the pupil is added is combined with a luminance component formed with the infrared light image, and the resultant image is output.

Figure 20:
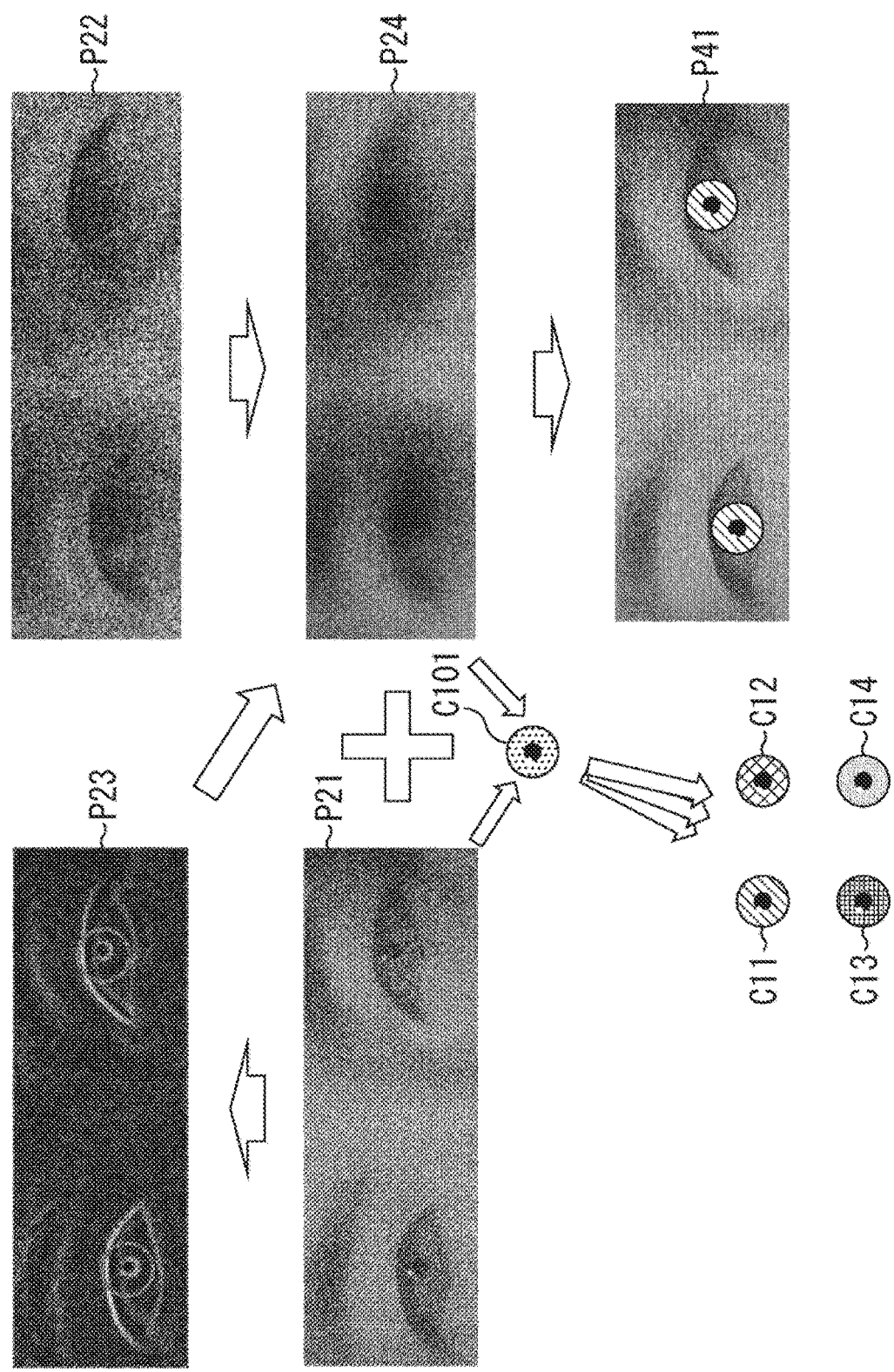
FIG. 20 is a diagram for explaining an iris correction process to be performed by the iris correction processing unit shown in FIG. 18.

That is, as shown in an image P41 in FIG. 20, after a chrominance component extracted from a visible light image from which noise has been removed by a noise removal filter in conformity with the positions and the shapes of the pupils is combined with an infrared light image as a luminance component, one of pupils C11 through C14 preset in the preset pupil memory 151a, whichever is the most similar in hue to a pupil C101 in the image, is selected by the approximate hue selection unit 151b, and the selected pupil is added in conformity with the detected positions and shapes.

Through the above described process, the pupil having the most similar hue among preset pupils is added in the position and the shape, so that a pupil in the most natural color is added after the shapes of the pupils are corrected. Thus, a face image can be appropriately corrected.

As for a nose correction process, an image of the nose can be appropriately corrected by correcting the color of the skin in the region forming the nose, as in the above described skin color correction process.

Further, as for a mouth correction process, an image of the mouth can be appropriately corrected by correcting the color of the lips in a similar manner to that in the iris correction process.

Through the above series of processes, respective images of the various organs constituting a face image are corrected, and a face image formed with the corrected organ images is corrected. Thus, appropriate image correction can be performed for each organ, and a face image can be appropriately corrected even in the dark.

<Fifth Example Configuration of the Iris Correction Processing Unit>

In the example described above, the pupil addition unit 151 selects the pupil in the most similar color among the pupil chrominance components preset in the preset pupil memory 151a in accordance with the positions and the shapes of the pupils detected by the pupil detection unit 128, and adds the selected pupil to the chrominance component in the positions and the shapes of the pupils. However, such an addition may be made not only to chrominance components but also luminance components.

Figure 21:
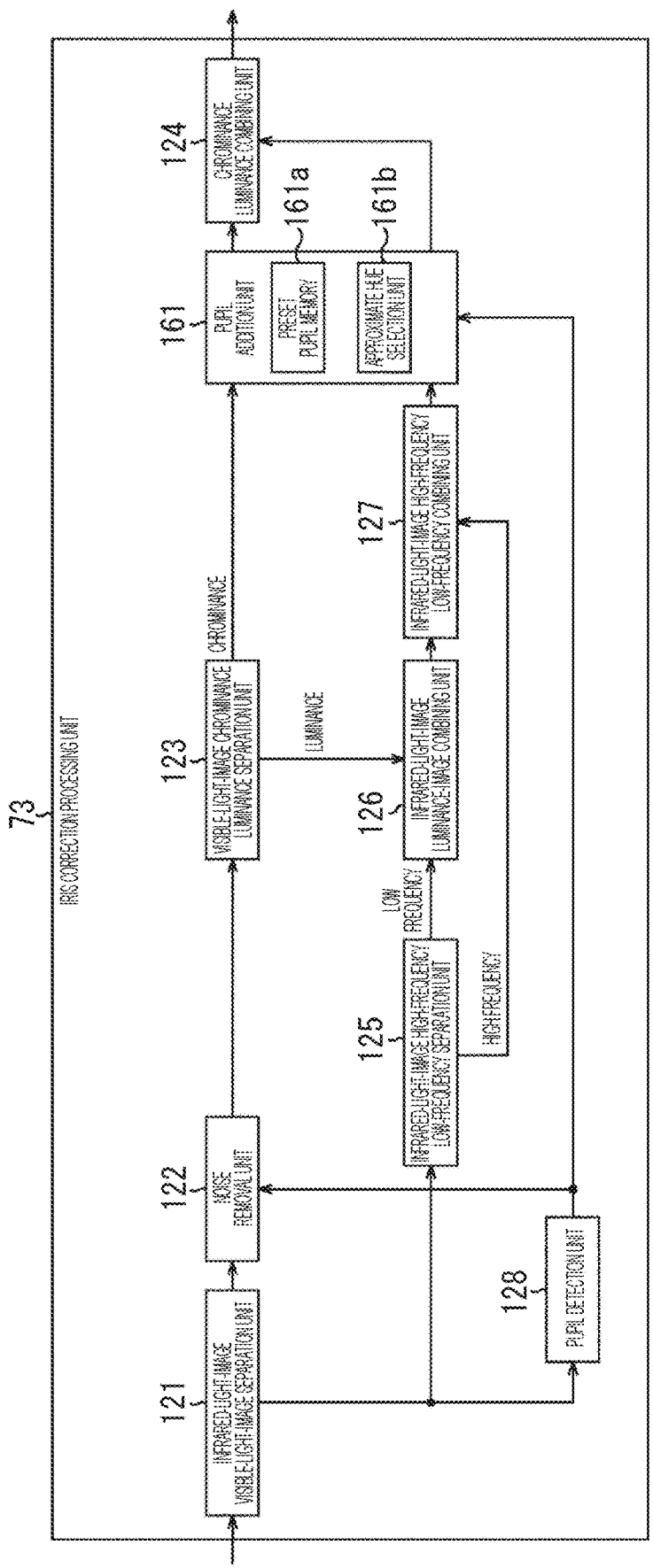
FIG. 21 is a diagram for explaining a fifth example configuration of the iris correction processing unit of the image processing unit shown in FIG. 3.

FIG. 21 shows a fifth example configuration of the iris correction processing unit 73 that has chrominance components and luminance components as the information about the pupils that are preset in advance, and add the chrominance components and the luminance components of the respective pupils in accordance with pupil positions and shapes detected by the pupil detection unit 128. It should be noted that, in the configuration of the iris correction processing unit 73 in FIG. 21, components having the same functions as those shown in the iris correction processing unit 73 shown in FIG. 18 have the same reference numerals and the same names as those in FIG. 18, and explanation of them will not be made below.

Specifically, the iris correction processing unit 73 shown in FIG. 21 differs from the iris correction processing unit 73 shown in FIG. 18 in that the pupil addition unit 151 is replaced with a pupil addition unit 161.

Basically, the function of the pupil addition unit 161 is similar to that of the pupil addition unit 151. However, an approximate hue selection unit 161b is provided, and chrominance components and luminance components of pupils preset in the preset pupil memory 161a are added to chrominance components and luminance components similar to captured chrominance components and luminance components. That is, in this case, after a chrominance component and a luminance component that are preset are added to the chrominance component and the luminance component of a visible light image, respectively, the chrominance component and the luminance component are combined. It should be noted that an iris correction process in the configuration correction processing unit 73 in FIG. 19 is basically similar to the process described above with reference to the flowchart shown in FIG. 18, and therefore, explanation thereof is not made herein.

In this case, however, in step S158, the pupil addition unit 161 reads out pupil chrominance components and pupil luminance components preset in the preset pupil memory 161a, in accordance with the positions and the shapes of the pupils detected by the pupil detection unit 128. The approximate hue selection unit 161b selects those similar to the chrominance component and the luminance component of a captured visible light image, and the selected components are added in step S159.

Through the above described process, an image of each of the organs constituting a face image is corrected by a correction process suitable for the organ, and images corrected for the respective organs are combined. Thus, the face image can be appropriately corrected. In the example described above, the organs such as the skin color, the pupils, the nose, and the mouth are extracted, and images of the respective organs are corrected. However, some other organs may be extracted, and correction for each of the organs may be performed. For example, the eyebrows, the head hair, and the like may be extracted, and be subjected to processing suitable for each of these organs.

<Variations of the Imaging Unit, the Infrared Light Emitting Unit, and the White Light Emitting Unit>

Various arrangement variations are possible for the imaging unit 31, the infrared light emitting unit 32, and the white light emitting unit 33.

Figure 22:
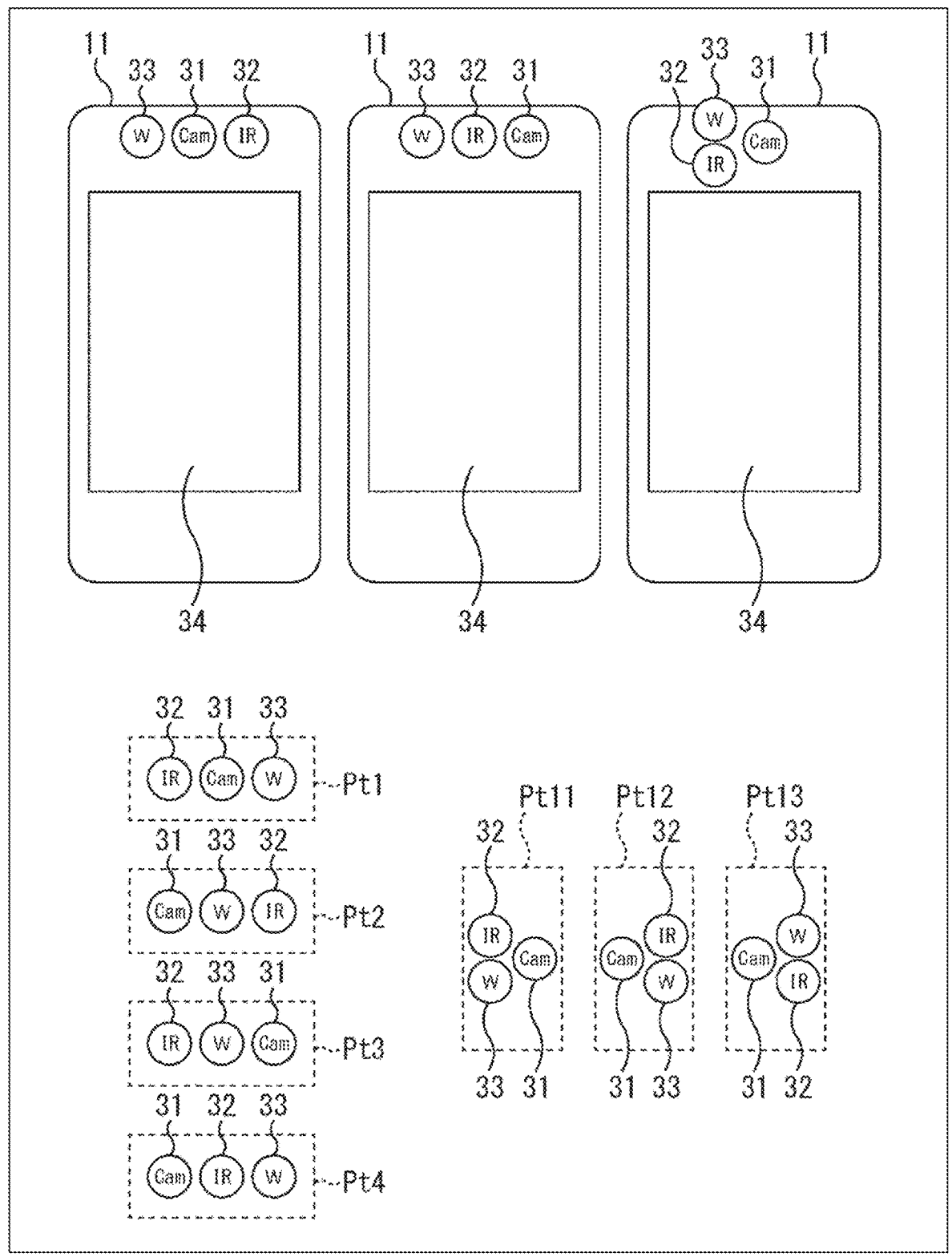
FIG. 22 is a diagram for explaining variations of arrangement patterns for the imaging unit, the infrared light emitting unit, and the white light emitting unit of the information processing device shown in FIG. 1.

For example, as shown in the upper left portion of FIG. 22, the white light emitting unit 33, the imaging unit 31, and the infrared light emitting unit 32 may be arranged in this order from the left in the drawing. As shown in the upper central portion of FIG. 22, the white light emitting unit 33, the infrared light emitting unit 32, and the imaging unit 31 may be arranged in this order.

Also, as shown in an arrangement example Pt1, the infrared light emitting unit 32, the imaging unit 31, and the white light emitting unit 33 may be arranged in this order. As shown in an arrangement example Pt2, the imaging unit 31, the white light emitting unit 33, and the infrared light emitting unit 32 may be arranged in this order. As shown in an arrangement example Pt3, the infrared light emitting unit 32, the white light emitting unit 33, and the imaging unit 31 may be arranged in this order. As shown in an arrangement example Pt4, the imaging unit 31, the infrared light emitting unit 32, and the white light emitting unit 33 may be arranged in this order.

Further, as shown in the upper right portion of FIG. 22, the infrared light emitting unit 32 may be provided immediately below the white light emitting unit 33, and the imaging unit 31 may be provided to the right at an intermediate position between the white light emitting unit 33 and the infrared light emitting unit 32 in the vertical direction.

Likewise, as shown in an arrangement example Pt11, the white light emitting unit 33 may be provided immediately below the infrared light emitting unit 32, and the imaging unit 31 may be provided to the right at an intermediate position between the white light emitting unit 33 and the infrared light emitting unit 32 in the vertical direction. Also, as shown in an arrangement example Pt12, the imaging unit 31 may be provided to the left.

Further, as shown in an arrangement example Pt13, the infrared light emitting unit 32 and the white light emitting unit 33 in the arrangement example Pt12 may switch positions with each other.

Figure 23:
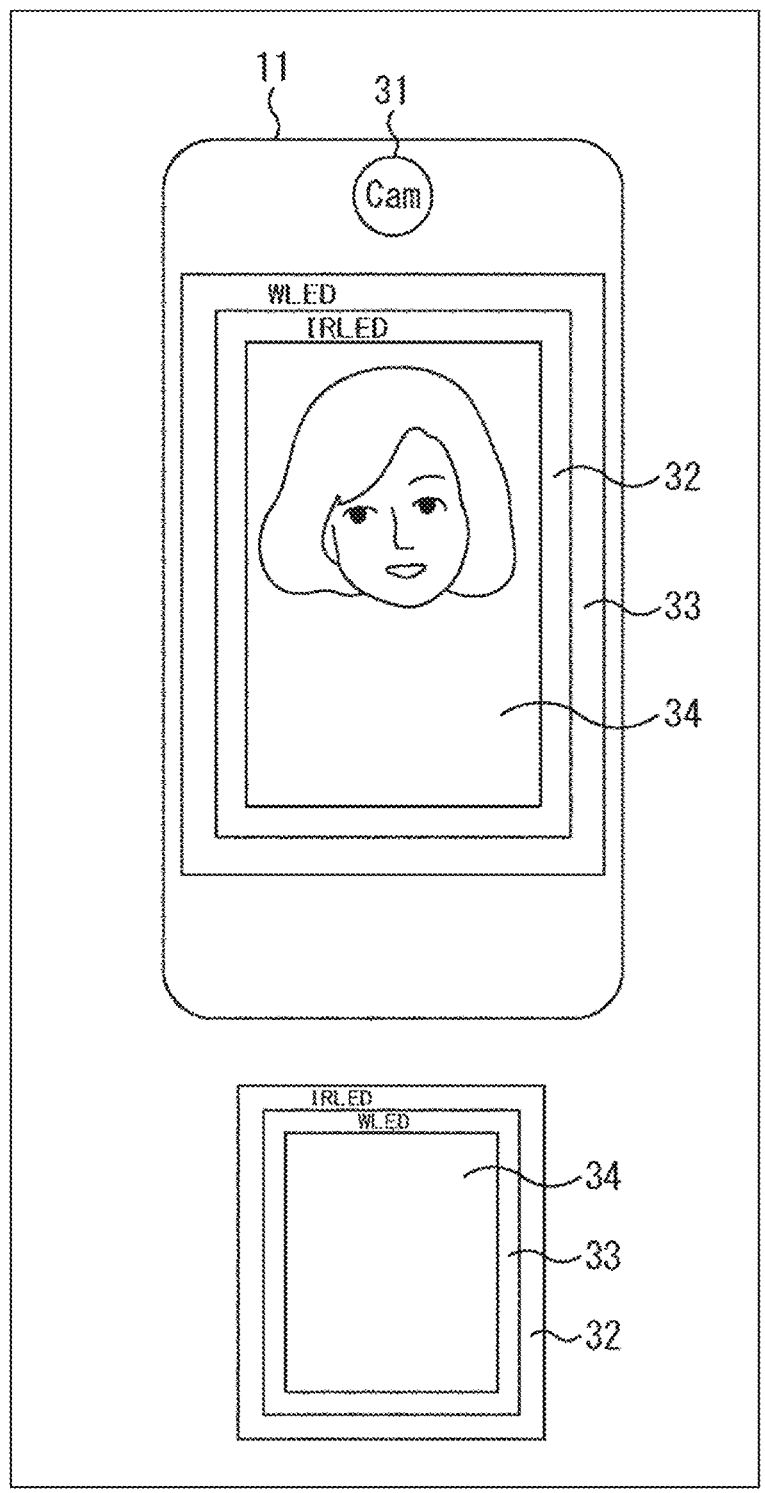
FIG. 23 is a diagram for explaining variations of arrangement patterns for the imaging unit, the infrared light emitting unit, and the white light emitting unit of the information processing device shown in FIG. 1.

Alternatively, as shown in the upper portion of FIG. 23, the infrared light emitting unit 32 may be formed in the shape of a frame surrounding the display unit 34, and the white light emitting unit 33 may be further provided in the shape of a frame surrounding the infrared light emitting unit 32.

Further, as shown in the lower portion of FIG. 23, the white light emitting unit 33 may be formed in the shape of a frame surrounding the display unit 34, and the infrared light emitting unit 32 may be further provided in the shape of a frame surrounding the white light emitting unit 33.

<Examples where Processes are Carried Out by Software>

While the above described series of processes can be performed by hardware, those processes can also be performed by software. In a case where the series of processes are performed by software, the program that forms the software may be installed in a computer incorporated into special-purpose hardware, or may be installed from a recording medium into a general-purpose personal computer or the like, for example, that can execute various kinds of functions by installing various kinds of programs.

Figure 24:
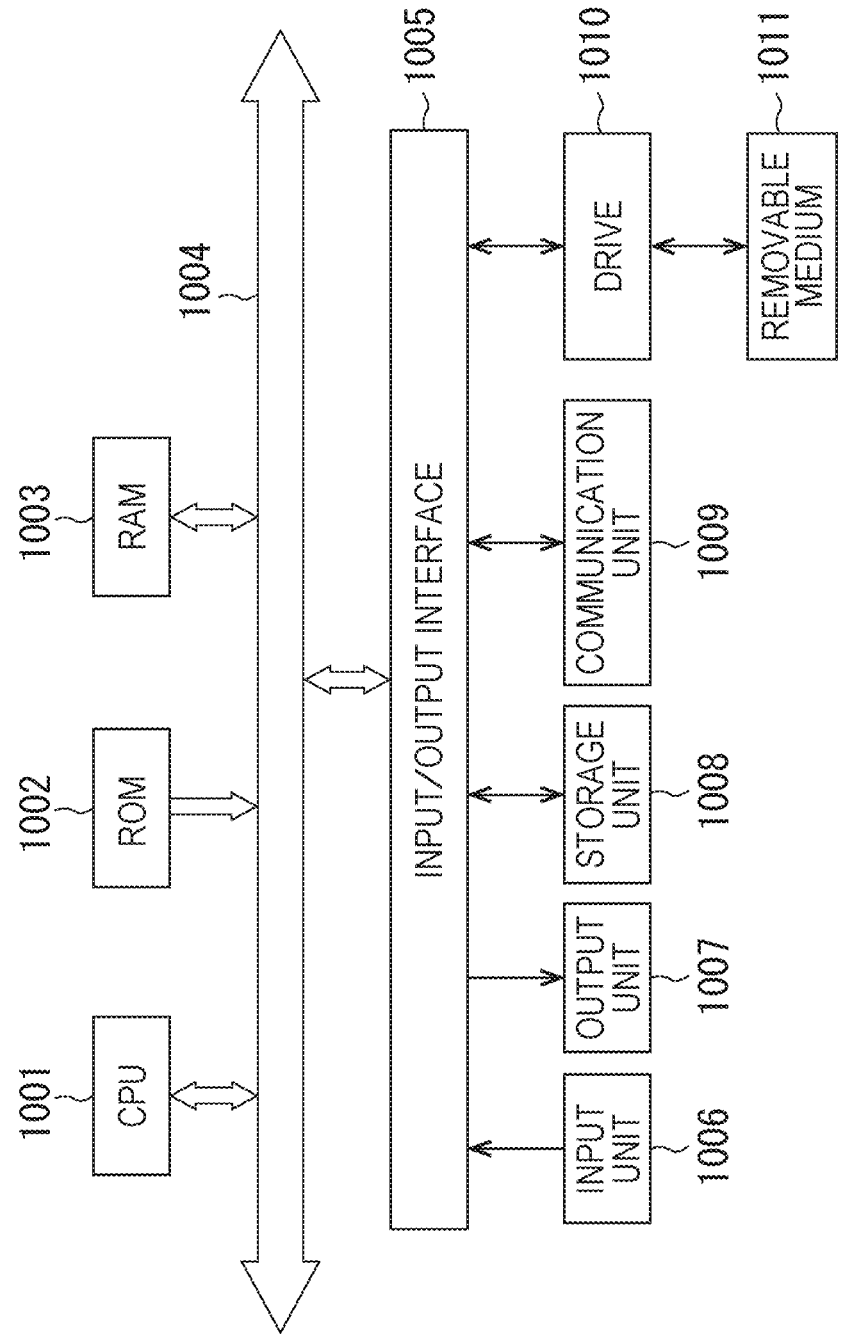
FIG. 24 is a diagram for explaining an example configuration of a general-purpose personal computer.

FIG. 24 shows an example configuration of a general-purpose personal computer. This personal computer includes a central processing unit (CPU) 1001. An input/output interface 1005 is connected to the CPU 1001 via a bus 1004. A read-only memory (ROM) 1002 and a random access memory (RAM) 1003 are connected to the bus 1004.

An input unit 1006, an output unit 1007, a storage unit 1008, and a communication unit 1009 are connected to the input/output interface 1005: the input unit 1006 is formed with an input device such as a keyboard or a mouse through which a user inputs an operation command; the output unit 1007 outputs an image of a process operating screen or a processing result to a display device; the storage unit 1008 is formed with a hard disk drive or the like that stores programs and various kinds of data; and the communication unit 1009 is formed with a local area network (LAN) adapter or the like, and performs a communication process via a network that is typically the Internet. A drive 1010 is also connected to the input/output interface 1005. The drive 1010 performs data reading and writing on a removable medium 1011, such as a magnetic disk (such as a flexible disk), an optical disk (such a Compact Disc-Read-Only Memory (CD-ROM) or a Digital Versatile Disc (DVD)), a magnetooptical disk (such as Mini Disc (MD)), or a semiconductor memory.

The CPU 1001 performs various processes in accordance with a program that is stored in the ROM 1002, or a program that is read from the removable medium 1011, which is a magnetic disk, an optical disk, a magnetooptical disk, a semiconductor memory, or the like, is installed into the storage unit 1008, and is loaded from the storage unit 1008 into the RAM 1003. The RAM 1003 also stores data and the like necessary for the CPU 1001 to perform various processes, as appropriate.

In the computer having the above described configuration, for example, the CPU 1001 loads a program stored in the storage unit 1008 into the RAM 1003 via the input/output interface 1005 and the bus 1004, and executes the program, so that the above described series of processes are performed.

The program to be executed by the computer (the CPU 1001) may be recorded on the removable medium 1011 as a package medium to be provided, for example. Alternatively, the program can be provided via a wired or wireless transmission medium, such as a local area network, the Internet, or digital satellite broadcasting.

In the computer, the program can be installed into the storage unit 1008 via the input/output interface 1005 when the removable medium 1011 is mounted on the drive 1010. Also, the program may be received by the communication unit 1009 via a wired or wireless transmission medium, and be installed into the storage unit 1008. Alternatively, the program may be installed beforehand into the ROM 1002 or the storage unit 1008.

It should be noted that the program to be executed by the computer may be a program for performing processes in chronological order in accordance with the sequence described in the present specification, or may be a program for performing processes in parallel or performing a process when necessary, such as when there is a call.

Also, in this specification, a system means an assembly of components (devices, modules (parts), and the like), and not all the components need to be provided in the same housing. In view of this, a plurality of devices that are housed in different housings and are connected to one another via a network form a system, and one device having a plurality of modules housed in one housing is also a system.

It should be noted that embodiments of the present disclosure are not limited to the above described embodiment, and various modifications may be made to the embodiment without departing from the scope of the present disclosure.

For example, the present disclosure can be embodied in a cloud computing configuration in which one function is shared among devices via a network, and processing is performed by the plurality of devices cooperating with one another.

Also, the respective steps described with reference to the above described flowcharts can be carried out by one device or can be shared among the plurality of devices.

Further, in a case where more than one process is included in one step, the plurality of processes included in the step can be performed by one device or can be shared among a plurality of devices.

It should be noted that the present disclosure may also be embodied in the configurations described below.

<1>
An information processing device including:
an imaging unit that captures a visible light image and an infrared light image;
an organ extraction unit that recognizes a face image from the infrared light image, and extracts images of respective organs from the face image;
an organ image correction unit that corrects the images of the respective organs in accordance with each organ extracted by the organ extraction unit, using the visible light image and the infrared light image; and
a combining unit that combines the images of the respective organs corrected by the organ image correction unit.

<2>
The information processing device of <1>, in which the organ image correction unit includes an image correction unit that corrects the images for each of the organs.

<3>
The information processing device of <2>, in which the images of the respective organs include a skin color image, an iris image, a mouth image, and a nose image, and
the image correction unit includes a skin color image correction unit that corrects the skin color image, an iris image correction unit that corrects the iris image, a mouth image correction unit that corrects the mouth image, and a nose image correction unit that corrects the nose image.

<4>
The information processing device of <3>, in which the skin color image correction unit includes:
a separation unit that separates the visible light image in the skin color image into a chrominance component and a luminance component;
a luminance component generation unit that generates a new luminance component by combining the luminance component separated by the separation unit and the infrared light image at a predetermined ratio; and
a chrominance luminance combining unit that combines the new luminance component with the chrominance component, to generate an image having the skin color image corrected.

<5>
The information processing device of <4>, further including
an operation input unit that receives an input of the predetermined ratio,
in which the luminance component generation unit combines the luminance component separated by the separation unit and the infrared light image at the predetermined ratio received as an input by the operation input unit, and generates a new luminance component.

<6>
The information processing device of <3>, in which the skin color image correction unit includes:
a separation unit that separates the visible light image in the skin color image into a chrominance component and a luminance component;
a comparison unit that compares a magnitude of a signal level of the luminance component separated by the separation unit with a magnitude of a signal level of the infrared light image on a pixel-by-pixel basis; and
an adjustment unit that adjusts saturation of the chrominance component to the signal level of the infrared light image on the pixel-by-pixel basis, in accordance with a result of the comparison performed by the comparison unit.

<7>
The information processing device of <6>, in which,
if the comparison unit determines that the signal level of the infrared light image is higher than the signal level of the luminance component separated by the separation unit, the adjustment unit raises the saturation of the chrominance component to the signal level of the infrared light image, and,
if the comparison unit determines that the signal level of the infrared light image is lower than the signal level of the luminance component separated by the separation unit, the adjustment unit lowers the saturation of the chrominance component to the signal level of the infrared light image.

<8>
The information processing device of <6>, in which the adjustment unit includes a chrominance component extraction unit that extracts a chrominance component of a pixel near a target pixel, and,
when a signal level of a luminance component of the target pixel is lower than an achromatic color determination threshold, the adjustment unit replaces the chrominance component of the visible light image at the target pixel with the chrominance component of the pixel near the target pixel, the chrominance component of the pixel near the target pixel being extracted by the chrominance component extraction unit.

<9>
The information processing device of <6>, in which the nose image correction unit corrects the nose image by a technique similar to a technique used by the skin color image correction unit.

<10>
The information processing device of <3>, in which the iris image correction unit includes:
a pupil detection unit that detects a position and a shape of a pupil from the infrared light image in the iris image, a noise removal unit that removes noise from the visible light image of the iris image with a noise filter in conformity with the position and the shape of the pupil detected by the pupil detection unit;

a chrominance luminance separation unit that separates a chrominance component and a luminance component from the visible light image of the iris image from which noise has been removed by the noise removal unit;

an infrared light combining unit that combines the infrared light component of the iris image with the luminance component of the visible light image of the iris image; and a chrominance luminance combining unit that combines the chrominance component of the visible light image of the iris image separated by the chrominance luminance separation unit with a luminance component formed with the signal level of the infrared light image generated by the infrared light combining unit.

<11>

The information processing device of <10>, in which the iris image correction unit further includes:

a pupil correction unit that has a holding unit for holding chrominance components of pupils in a plurality of colors in a preset state, and attaches one of the chrominance components of the pupils in conformity with the position and the shape detected by the pupil detection unit, and the pupil correction unit attaches the chrominance component of a pupil selected from among the chrominance components of the pupils in the plurality of colors to the chrominance component of the visible light image of the iris image separated by the chrominance luminance separation unit, in conformity with the position and the shape detected by the pupil detection unit, the chrominance components of the pupils in the plurality of colors being held in the holding unit.

<12>

The information processing device of <10>, in which the iris image correction unit further includes:

a pupil correction unit that has the holding unit for holding chrominance components and luminance components of pupils in a plurality of colors in a preset state, and attaches the chrominance component and the luminance component of one of the pupils in conformity with the position and the shape detected by the pupil detection unit, and the pupil correction unit attaches the chrominance component and the luminance component of a pupil selected from among the chrominance components and the luminance components of the pupils in the plurality of colors to the chrominance component of the visible light image of the iris image separated by the chrominance luminance separation unit and the luminance component formed with the signal level of the infrared light image generated by the infrared light combining unit, respectively, in conformity with the position and the shape detected by the pupil detection unit, the chrominance components and the luminance components of the pupils in the plurality of colors being held in the holding unit.

<13>

The information processing device of <10>, in which the iris image correction unit further includes:

a pupil correction unit that includes: a holding unit that holds chrominance components of pupils in a plurality of colors in a preset state; and an approximate hue selection unit that selects a pupil in a similar hue in the position and the shape detected by the pupil detection unit from among the chrominance components of the pupils in the plurality of colors held in a preset state, the pupil correction unit attaching one of the chrominance components of the pupils in the plurality of colors held in a preset state in conformity with the position and the shape detected by the pupil detection unit, and the pupil correction unit attaches the chrominance component of a pupil in a hue selected from among the chrominance components of the pupils in the plurality of colors by the approximate hue selection unit to the chrominance component of the visible light image of the iris image separated by the chrominance luminance separation unit, in conformity with the position and the shape detected by the pupil detection unit, the chrominance components of the pupils in the plurality of colors being held in the holding unit.

<14>

The information processing device of <10>, in which the iris image correction unit further includes:

a pupil correction unit that includes: a holding unit that holds chrominance components and luminance components of pupils in a plurality of colors in a preset state; and an approximate hue selection unit that selects a pupil in a similar hue in the position and the shape detected by the pupil detection unit from among the chrominance components and the luminance components of the pupils in the plurality of colors held in a preset state, the pupil correction unit attaching the chrominance component and the luminance component of one of the pupils in the plurality of colors held in a preset state in conformity with the position and the shape detected by the pupil detection unit, and the pupil correction unit attaches the chrominance component and the luminance component of a pupil in a hue selected from among the chrominance components and the luminance components of the pupils in the plurality of colors by the approximate hue selection unit to the chrominance component of the visible light image of the iris image separated by the chrominance luminance separation unit and the luminance component formed with the signal level of the infrared light image generated by the infrared light combining unit, respectively, in conformity with the position and the shape detected by the pupil detection unit, the chrominance components and the luminance components of the pupils in the plurality of colors being held in the pupil holding unit.

<15>

The information processing device of <10>, in which the mouth image correction unit corrects the mouth image by a technique similar to a technique used by the iris image correction unit.

<16>

An information processing method including the steps of:
capturing a visible light image and an infrared light image;
recognizing a face image from the infrared light image, and extracting images of respective organs from the face image;
correcting the images of the respective organs in accordance with each extracted organ, using the visible light image and the infrared light image; and
combining the corrected images of the respective organs.

<17>

A program for causing a computer to function as:
an imaging unit that captures a visible light image and an infrared light image;
an organ extraction unit that recognizes a face image from the infrared light image, and extracts images of respective organs from the face image;
an organ image correction unit that corrects the images of the respective organs in accordance with each organ extracted by the organ extraction unit, using the visible light image and the infrared light image; and a combining unit that combines the images of the respective organs corrected by the organ image correction unit.

REFERENCE SIGNS LIST

11 Information processing device
31 Imaging unit
32 Infrared light emitting unit
33 White light emitting unit
34 Display unit
51 Control unit
52 Image processing unit
71 Organ extraction unit
72 Skin color correction processing unit
73 Iris correction processing unit
74 Nose correction processing unit
75 Mouth correction processing unit
91 Infrared-light-image visible-light-image separation unit
92 Visible-light-image chrominance luminance separation unit
93 Infrared-light-image luminance-image combining unit
94 Combination ratio input unit
95 Chrominance luminance combining unit
101 Infrared light image luminance comparison unit
102 Chrominance adjustment unit
102a Chrominance component extraction unit
121 Infrared-light-image visible-light-image separation unit
122 Noise removal unit
123 Chrominance extraction unit
124 Chrominance luminance combining unit
125 Pupil detection unit
131 Pupil addition unit
131a Preset pupil memory
141 Pupil addition unit
141a Preset pupil memory
151 Pupil addition unit
151a Preset pupil memory
161 Pupil addition unit
161a Preset pupil memory
161b Approximate hue selection unit

The invention claimed is:

1. An information processing device comprising:
an imager that captures a visible light image and an infrared light image;
an organ extractor that recognizes a face image from the infrared light image, and extracts images of respective organs from the face image;
an organ image corrector that corrects the images of the respective organs in accordance with each organ extracted by the organ extractor, using the visible light image and the infrared light image; and
a combiner that combines corrected images of the respective organs, which have been corrected by the organ image corrector,
wherein the organ image corrector includes an image corrector that corrects the images for each of the organs,
wherein the images of the respective organs include a skin color image, an iris image, a mouth image, and a nose image, and
wherein the image corrector includes a skin color image corrector that corrects the skin color image, an iris image corrector that corrects the iris image, a mouth image corrector that corrects the mouth image, and a nose image corrector that corrects the nose image.

2. The information processing device according to claim 1, wherein the skin color image corrector includes:
a separation unit separator that separates the visible light image in the skin color image into a chrominance component and a luminance component;
a luminance component generator that generates a new luminance component by combining the luminance component separated by the separator and the infrared light image at a predetermined ratio; and
a chrominance luminance combiner that combines the new luminance component with the chrominance component, to generate an image having the skin color image corrected.

3. The information processing device according to claim 2, further comprising:
an operation receiver that receives an input of the predetermined ratio,
wherein the luminance component generator combines the luminance component separated by the separator and the infrared light image at the predetermined ratio received as an input by the operation receiver, to generate the new luminance component.

4. The information processing device according to claim 1, wherein the skin color image corrector includes:
a separator that separates the visible light image in the skin color image into a chrominance component and a luminance component;
a signal comparer that compares a magnitude of a signal level of the luminance component separated by the separator with a magnitude of a signal level of the infrared light image on a pixel-by-pixel basis; and
an adjuster that adjusts a saturation of the chrominance component to the signal level of the infrared light image on the pixel-by-pixel basis, in accordance with a result of a comparison performed by the signal comparer.

5. The information processing device according to claim 4, wherein,
if the signal comparer determines that the signal level of the infrared light image is higher than the signal level of the luminance component separated by the separator, the adjuster raises the saturation of the chrominance component to the signal level of the infrared light image, and,
if the signal comparer determines that the signal level of the infrared light image is lower than the signal level of the luminance component separated by the separator, the adjuster lowers the saturation of the chrominance component to the signal level of the infrared light image.

6. The information processing device according to claim 4, wherein
the adjuster includes a chrominance component extractor that extracts a chrominance component of a pixel near a target pixel, and,
when a signal level of a luminance component of the target pixel is lower than an achromatic color determination threshold, the adjuster replaces the chrominance component of the visible light image at the target pixel with the chrominance component of the pixel near the target pixel, the chrominance component of the pixel near the target pixel being extracted by the chrominance component extractor.

7. The information processing device according to claim 4, wherein the nose image corrector corrects the nose image by a technique similar to a technique used by the skin color image corrector.

8. The information processing device according to claim 1, wherein the iris image corrector includes:
- a pupil detector that detects a position and a shape of a pupil from the infrared light image in the iris image,
- a noise remover that removes noise from the visible light image of the iris image with a noise filter in conformity with the position and the shape of the pupil detected by the pupil detector;
- a chrominance luminance separator that separates a chrominance component and a luminance component from the visible light image of the iris image from which noise has been removed by the noise remover;
- an infrared light combiner that combines the infrared light component of the iris image with the luminance component of the visible light image of the iris image; and
- a chrominance luminance combiner that combines the chrominance component of the visible light image of the iris image separated by the chrominance luminance separator with a luminance component formed with the signal level of the infrared light image generated by the infrared light combiner.

9. The information processing device according to claim 8, wherein
the iris image corrector further includes a pupil corrector that has a holder for holding chrominance components of pupils in a plurality of colors in a preset state, and attaches one of the chrominance components of the pupils in conformity with the position and the shape detected by the pupil detector, and
the pupil corrector attaches the chrominance component of a pupil selected from among the chrominance components of the pupils in the plurality of colors to the chrominance component of the visible light image of the iris image separated by the chrominance luminance separator, in conformity with the position and the shape detected by the pupil detection unit, the chrominance components of the pupils in the plurality of colors being held in the holder.

10. The information processing device according to claim 8, wherein
the iris image corrector further includes a pupil corrector that has a holder for holding chrominance components and luminance components of pupils in a plurality of colors in a preset state, and attaches the chrominance component and the luminance component of one of the pupils in conformity with the position and the shape detected by the pupil detector, and
the pupil corrector attaches the chrominance component and the luminance component of a pupil selected from among the chrominance components and the luminance components of the pupils in the plurality of colors to the chrominance component of the visible light image of the iris image separated by the chrominance luminance separator and the luminance component formed with the signal level of the infrared light image generated by the infrared light combiner, respectively, in conformity with the position and the shape detected by the pupil detector, the chrominance components and the luminance components of the pupils in the plurality of colors being held in the holder.

11. The information processing device according to claim 8, wherein
the iris image corrector further includes a pupil corrector that includes: a holder that holds chrominance components of pupils in a plurality of colors in a preset state; and an approximate hue selector that selects a pupil in a similar hue in the position and the shape detected by the pupil detector from among the chrominance components of the pupils in the plurality of colors held in a preset state, the pupil corrector attaching one of the chrominance components of the pupils in the plurality of colors held in a preset state in conformity with the position and the shape detected by the pupil detector, and
the pupil corrector attaches the chrominance component of a pupil in a hue selected from among the chrominance components of the pupils in the plurality of colors by the approximate hue selector to the chrominance component of the visible light image of the iris image separated by the chrominance luminance separator, in conformity with the position and the shape detected by the pupil detector, the chrominance components of the pupils in the plurality of colors being held in the holder.

12. The information processing device according to claim 8, wherein
the iris image corrector further includes a pupil corrector that includes: a holder that holds chrominance components and luminance components of pupils in a plurality of colors in a preset state; and an approximate hue selector that selects a pupil in a similar hue in the position and the shape detected by the pupil detector from among the chrominance components and the luminance components of the pupils in the plurality of colors held in a preset state, the pupil corrector attaching the chrominance component and the luminance component of one of the pupils in the plurality of colors held in a preset state in conformity with the position and the shape detected by the pupil detector, and
the pupil corrector attaches the chrominance component and the luminance component of a pupil in a hue selected from among the chrominance components and the luminance components of the pupils in the plurality of colors by the approximate hue selector to the chrominance component of the visible light image of the iris image separated by the chrominance luminance separator and the luminance component formed with the signal level of the infrared light image generated by the infrared light combiner, respectively, in conformity with the position and the shape detected by the pupil detector, the chrominance components and the luminance components of the pupils in the plurality of colors being held in the holder.

13. The information processing device according to claim 8, wherein the mouth image corrector corrects the mouth image by a technique similar to a technique used by the iris image corrector.

14. An information processing method comprising:
- capturing a visible light image and an infrared light image;
- recognizing a face image from the infrared light image, and extracting images of respective organs from the face image;
- correcting the images of the respective organs in accordance with each extracted organ, using the visible light image and the infrared light image, to obtain corrected images; and
- combining the corrected images of the respective organs, wherein the images of the respective organs include a skin color image, an iris image, a mouth image, and a nose image, and wherein the correcting includes correcting the skin color image, correcting the iris image, correcting the mouth image, and correcting the nose image.

15. A non-transitory computer-readable storage medium storing a program that when executed by a computer causes the computer to perform an image processing method, wherein the method comprises:

obtaining a visible light image and an infrared light image;

recognizing a face image from the infrared light image, and extracting images of respective organs from the face image;

correcting the images of the respective organs in accordance with each organ extracted, using the visible light image and the infrared light image, to obtain corrected images; and combining the corrected images of the respective organs, wherein the images of the respective organs include a skin color image, an iris image, a mouth image, and a nose image, and wherein the correcting includes correcting the skin color image, correcting the iris image, correcting the mouth image, and correcting the nose image.

* * * * *